United States Patent
Singh et al.

(10) Patent No.: US 9,788,257 B2
(45) Date of Patent: Oct. 10, 2017

(54) METHOD AND SYSTEM FOR DYNAMICALLY FORMING SERVICE AWARE BLUETOOTH LOW ENERGY (BLE) MESH NETWORK

(71) Applicant: Samsung Electronics Co., Ltd., Suwon-si, Gyeonggi-do (KR)

(72) Inventors: Ajeet Kumar Singh, Bangalore (IN); Anand Sudhakar Chiddarwar, Bangalore (IN); Arzad Alam Kherani, Bangalore (IN); Dae-kyu Choi, Suwon-si (KR); Midhun K, Bangalore (IN); Sushanth Gajanan, Bangalore (IN); Do-jun Byun, Seoul (KR); Sang-Jun Moon, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/081,260

(22) Filed: Mar. 25, 2016

(65) Prior Publication Data
US 2017/0156102 A1  Jun. 1, 2017

(30) Foreign Application Priority Data

Mar. 27, 2015  (IN) ............................ 1592/CHE/2015
Nov. 26, 2015  (IN) ............................ 1592/CHE/2015

(51) Int. Cl.
*H04W 40/24* (2009.01)
*H04W 4/00* (2009.01)
*H04W 84/18* (2009.01)

(52) U.S. Cl.
CPC ......... *H04W 40/246* (2013.01); *H04W 4/008* (2013.01); *H04W 84/18* (2013.01)

(58) Field of Classification Search
CPC .... H04W 84/18; H04W 40/246; H04W 4/008
See application file for complete search history.

(56) References Cited

U.S. PATENT DOCUMENTS

| | | | |
|---|---|---|---|
| 9,094,407 B1* | 7/2015 | Matthieu | H04L 63/10 |
| 2010/0008293 A1* | 1/2010 | Gupta | H04W 92/20 370/328 |
| 2015/0245351 A1* | 8/2015 | Banerjea | H04W 40/023 370/338 |
| 2015/0358234 A1* | 12/2015 | Krieger | H04W 4/008 709/235 |
| 2016/0088424 A1* | 3/2016 | Polo | H04W 4/008 455/41.1 |
| 2016/0174022 A1* | 6/2016 | Nhu | H04W 4/005 455/41.2 |

* cited by examiner

*Primary Examiner* — Lewis West
(74) *Attorney, Agent, or Firm* — Jefferson IP Law, LLP

(57) ABSTRACT

A method of dynamically forming a service aware Bluetooth low energy (BLE) mesh network is provided. The method includes deriving service requirements for a BLE mesh service based on a unique identifier associated with the BLE mesh service, determining a BLE mesh service to be provided based on at least one BLE parameter, and dynamically forming a BLE mesh network based on the determined BLE mesh service, the service requirements and the at least one BLE parameter. The BLE mesh network is one of connection-oriented, or connection-less.

21 Claims, 23 Drawing Sheets

M → Master node
B → Bridge node
R → Relay node
- - - - Best route to destination
— · — Alternative route

| Controller(202) Requirement | User Configured | Application Configured | Current Network |
|---|---|---|---|
| Security | ● | ● | ○ |
| Reliability | ● | ○ | ● |
| Delay | ● | ○ | ● |
| Throughput | ○ | ○ | ○ |
| Geo-Limit | ○ | ○ | ○ |
| Power Consumption | ○ | ○ | ● |

The battery is getting low. Do you want to turn on battery savings?

FIG.19B

METHOD AND SYSTEM FOR DYNAMICALLY FORMING SERVICE AWARE BLUETOOTH LOW ENERGY (BLE) MESH NETWORK

CROSS-REFERENCE TO RELATED APPLICATION(S)

This application claims the benefit under 35 U.S.C. §119(e) of an Indian provisional patent application filed on Mar. 27, 2015 in the Indian Patent Office and assigned Serial number 1592/CHE/2015, and under 35 U.S.C. §119(a) of an Indian patent application filed on Nov. 26, 2015 in the Indian Patent Office and assigned Serial number 1592/CHE/2015, the entire disclosure of each of which is hereby incorporated by reference.

TECHNICAL FIELD

The present disclosure relates to a wireless communication service. More particularly, the present disclosure relates to a mechanism for dynamically forming a service-aware Bluetooth low energy (BLE) mesh network.

BACKGROUND

An increasing number of home automation applications, personal health care monitoring systems and emergency detection systems have interested research community in investing on Bluetooth low energy (BLE) wireless mesh network. Reliable and guaranteed transfer of data is primary requirement for any communication.

The electronic device applications may include a BLE mesh library as a native application. The BLE wireless mesh network can be configured according to the requirements of the application i.e., the mesh formation and operation of end nodes can be determined based on the application requirements. For example, usage of unicast or broadcast mechanisms can be determined based on application data transfer reliability aspects. There are various aspects of application which are taken into considerations by mesh solutions enabling user configurable mesh formation and mesh utilizing solution. Mesh application programming interfaces (APIs) may be provided for programmers to give application profiles and a universal unique identifier (UUIDs), preferable encryption scheme and keys, data transfer mode, and the like. The Mesh Library provides an API for application development. The mesh library can be configured by an application for service reference. The mesh library may provide different configurations, such as a connection based mesh network and a broadcast based mesh network, and the like.

The BLE mesh may include API's for applications to mention their desired service and UUID, nature of mesh needed, based on a type of service (i.e., connection-less or connection oriented), application's power and latency requirements, desired BLE connection parameters, and the like. The BLE mesh supports an advertising-scanning mode (i.e., connection-less), an aggressive discovery mode, and a connected mode.

The mesh formation logic includes an association logic that performs node authentication, a key exchange procedure and data encryption facility (which can be enabled/disabled). The mesh formation logic also includes topology formation that comprises routing table for best next neighbor or hop selection (connection-oriented) and seed based synchronization amongst nodes (connection-less).

The data forwarding logic includes forwarding UUID specific mesh data to application, interacting with mesh formation to know best routes/advertisement neighbors, connectionless data transfer with or without overhearing.

The mesh traffic handling includes data processing: conversion between mesh and application packet and forwarding mesh traffic for other nodes and services.

BLE mesh networks broadcast packets of the related art are for route discovery and transmission of data. However, broadcast packets are not acknowledged in any wireless systems, thus reducing reliability.

In the BLE mesh network implementation of the related art, communication devices in the mesh network use advertisement/broadcast packet to relay mesh data from one node to another node towards final destination. The total number of advertisement channels are fixed (it is 3 in the case of BLE) and the nature of advertisement/broadcast is unreliable. Accordingly, there is a possibility of packet-loss, collision and interference from other nodes (or even from other medium, such as Wi-Fi, and the like) during data relay at intermediate mesh node. It will create the problem for data transmission and reduce the overall efficiency and capacity of the mesh network.

The BLE devices in the mesh network cannot transmit and receive packet simultaneously. The BLE devices switch their role to perform these tasks. There is possibility of losing packet by neighbour nodes because of their state. If a particular BLE device is in an advertising state, the particular BLE device cannot receive mesh data transmitted by other devices at the same time.

Therefore, a need exists for a method and an apparatus for dynamically forming a service aware BLE mesh network.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for dynamically forming a service aware Bluetooth low energy (BLE) mesh network.

Another aspect of the present disclosure is to provide a method for deriving service requirements for a BLE mesh service based on a unique identifier associated with the BLE mesh service.

Another aspect of the present disclosure is to provide a method for determining a BLE mesh service to be provisioned based on at least one BLE parameter.

In accordance with an aspect of the present disclosure, a method of dynamically forming a service aware BLE mesh network is provided. The method includes deriving service requirements for a BLE mesh service based on a unique identifier associated with the BLE mesh service, determining a BLE mesh service to be provided based on at least one BLE parameter, and dynamically forming a BLE mesh network based on the determined BLE mesh service, the service requirements and the at least one BLE parameter. The BLE mesh network is one of connection oriented, or connection-less.

In accordance with another aspect of the present disclosure, an apparatus for dynamically forming a service aware BLE mesh network is provided. The apparatus includes deriving service requirements for a BLE mesh service based on a unique identifier associated with the BLE mesh service, determining a BLE mesh service to be provided based on at least one BLE parameter, and dynamically forming the BLE mesh network based on the determined BLE mesh service, the service requirements and at least one BLE parameters. The BLE mesh network is one of connection oriented, or connection-less.

In accordance with another aspect of the present disclosure, at least one non-transitory machine-readable storage medium is provided. The at least one non-transitory machine-readable storage medium includes a computer program of instructions configured to be readable by at least one processor for instructing the at least one processor to execute a computer process. The computer program instructions, when executed, causes the actions including deriving service requirements for a BLE mesh service based on a unique identifier associated with the BLE mesh service, determining a BLE mesh service to be provided based on at least one BLE parameter, and dynamically forming a BLE mesh network based on the determined BLE mesh service, the service requirements and at least one BLE parameter. The BLE mesh network is one of connection oriented, or connection-less.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 19A and 19B illustrate a method for configuring a BLE mesh network according to various embodiments of the present disclosure.

Throughout the drawings, it should be noted that like reference numbers are used to depict the same or similar elements, features, and structures.

DETAILED DESCRIPTION

Figure 1:
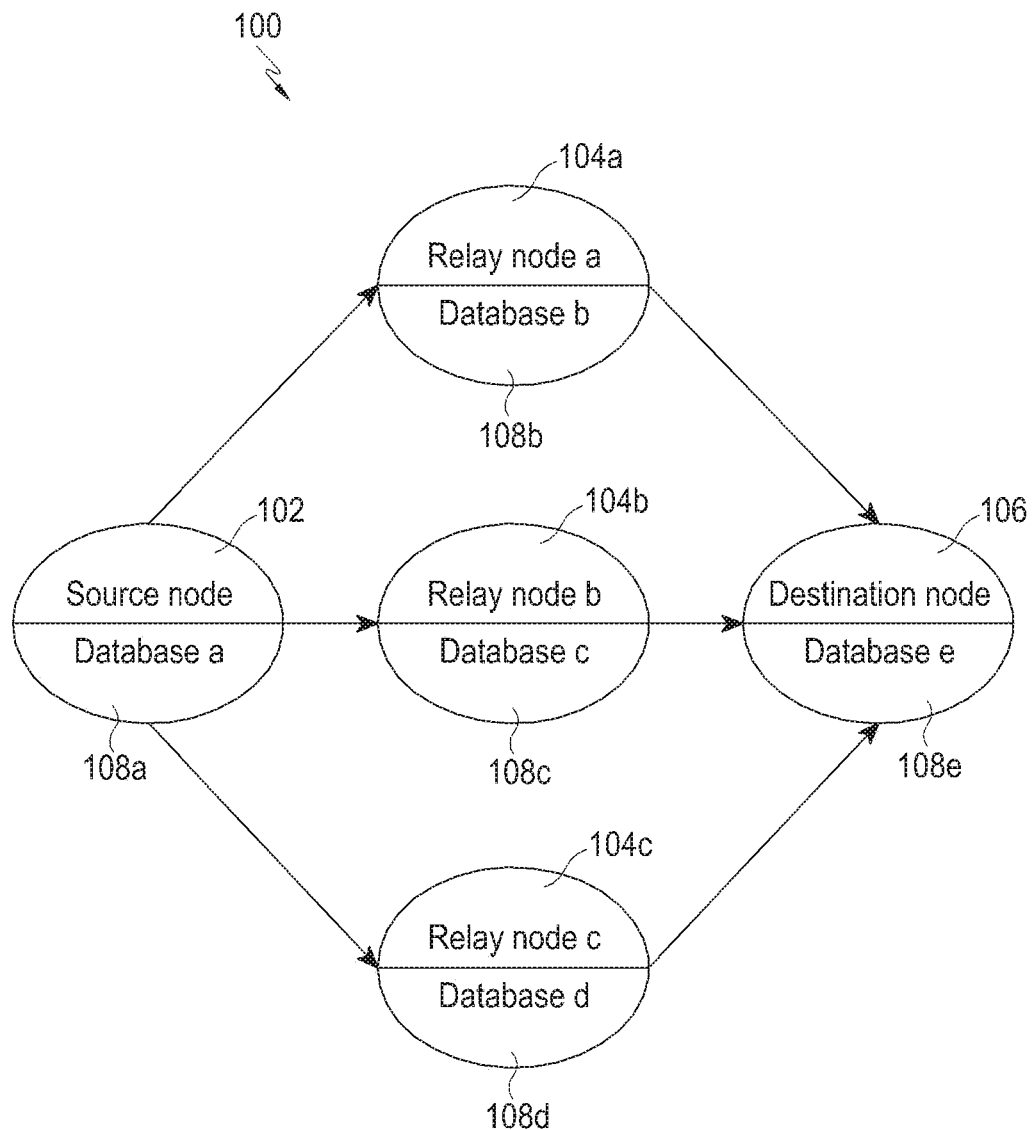
FIG. 1 illustrates a high level overview of a system of dynamically forming a service aware Bluetooth low energy (BLE) mesh network according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more at least one of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Various embodiments of the present disclosure described herein are not necessarily mutually exclusive, as some embodiments can be combined with at least one other embodiment to form new embodiments. The term "or" as used herein, refers to a non-exclusive or, unless otherwise indicated.

Various embodiments of the present disclosure described herein achieve a method of dynamically forming a service aware Bluetooth low energy (BLE) mesh network. The method includes deriving service requirements for a BLE mesh service based on a unique identifier associated with the BLE mesh service.

In an embodiment of the present disclosure, the unique identifier includes a universal unique identifier (UUID).

In an embodiment of the present disclosure, the service requirements are derived based on a user preference. For example, a user can set priority for the BLE mesh service and the method may include mapping the priority of the BLE mesh service with the UUID associated with the BLE mesh service.

In an embodiment of the present disclosure, the service requirements are derived based on a pre-configured setting. For example, the method may include selecting a default service requirement if there is no user preference.

Further, the method may include determining the BLE mesh service to be provisioned based on at least one BLE parameter.

In an embodiment of the present disclosure, the at least one BLE parameter includes power status of participating nodes, and priority associated with the BLE mesh service, at least one of a number of participating nodes available, and role preferences of the participating nodes.

Further, the method may include dynamically forming a BLE mesh network based on the determined BLE mesh service, the service requirements and the at least one BLE parameter.

In an embodiment of the present disclosure, the BLE mesh network is one of connection oriented, or connection-less.

In an embodiment of the present disclosure, the method may include allowing participating nodes to indicate a preference for a role based on the power status, intent to relay data packets, and for the BLE mesh service.

In an embodiment of the present disclosure, the method may include forming a plurality of paths towards a destination node in the participating nodes based on priority associated with the BLE mesh service and availability of multiple neighboring (or adjacent) nodes.

In an embodiment of the present disclosure, the method may include automatically reconfiguring the BLE mesh network based on availability of the participating nodes.

In an embodiment of the present disclosure, the method may include configuring the BLE mesh network by receiving an input from a user.

In an embodiment of the present disclosure, the method may include configuring the BLE mesh network by identifying a configuration parameter suitable for operation of the BLE mesh network based on one of a set of network configuration values, and default configuration values to meet the service requirements.

In an embodiment of the present disclosure, the method may include mapping priority of each BLE mesh service and impact of each BLE mesh service based on a mesh performance parameter and on each participating node.

In an embodiment of the present disclosure, the node in the participating nodes may maintain information related to each data packet transmitted through each node in a database.

In an embodiment of the present disclosure, the information may include address of neighboring nodes, a message integrity check (MIC), retransmission counts, and one of a number of overhearing based acknowledgement received from the participating nodes and/or an explicit acknowledgement received from the participating nodes.

Various embodiments of the present disclosure described herein disclose an apparatus for dynamically forming a service aware BLE mesh network. The apparatus is configured to derive (or determine or identify) service requirements for a BLE mesh service based on a unique identifier associated with the BLE mesh service. The apparatus is further configured to determine a BLE mesh service to be provided based on at least one BLE parameter. The apparatus is further configured to dynamically form the BLE mesh network based on the determined BLE mesh service, the service requirements and at least one BLE parameter. The BLE mesh network is one of connection oriented, or connection-less.

Unlike the mechanisms of the related art, the proposed method and apparatus provide a mechanism to improve reliability in the BLE mesh network. The method dynamically adapts to network conditions to achieve reliable transmission by various methods, such as varying the retransmission counts by overhearing packets and observing a received signal strength indicator (RSSI) variant. The method may include RSSI and time instance based retransmission back-off logic to avoid collision and interference. The method includes providing an implicit acknowledgement (ACK) from next hop neighbors and explicit ACK packet from destination to its neighbors to indicate to stop their multiple transmissions in BLE broadcast networks.

Referring now to the drawings and more particularly to FIGS. 1 to 20, where similar reference characters denote corresponding features consistently throughout the figure, there are shown preferred embodiments.

FIG. 1 illustrates a high level overview of a system of dynamically forming a service aware BLE mesh network according to various embodiments of the present disclosure.

Referring to FIG. 1, a system 100 includes a source node 102, a set of relay nodes 104a to 104c (hereinafter referred as the relay nodes 104), a destination node 106, and a database 108a to 108e (hereinafter referred as the database 108). The system 100 is configured to derive the service requirements for a BLE mesh service based on a unique identifier associated with the BLE mesh service. In an embodiment of the present disclosure, the unique identifier is the UUID.

Further, the system 100 is configured to determine a BLE mesh service to be provisioned based on at least one BLE parameter. In an embodiment of the present disclosure, the BLE parameters may be at least one of power status of participating nodes, and priority associated with the BLE mesh service, at least one of a number of participating nodes available, and role preferences of the participating nodes. Further, the system 100 may be configured to dynamically form the BLE mesh network based on the determined BLE mesh service, the service requirements and at least one BLE parameter. In an embodiment of the present disclosure, the BLE mesh network may be one of connection oriented, or connection-less.

The BLE mesh service can be, for example but not limited to, an object tracking service, a facility search service, an event-based gaming service, medical emergency service, and the like. In an embodiment of the present disclosure, the system 100 is configured to dynamically form the BLE mesh network by determining the BLE mesh network to be formed based on the BLE mesh service provisioned by the BLE mesh network, the power status of participating nodes (i.e., the source node 102, the relay node 104, and the destination node 106), and the priority associated with the service.

In an embodiment of the present disclosure, the system 100 is configured to allow the participating nodes to indicate a preference for a role based on the power status, intent to relay data packets, and for the BLE mesh service. In an example, the role of participating node denotes bridge, relay, end consumer, and the like.

In an embodiment of the present disclosure, the system 100 is configured to form the plurality of paths towards the destination node 106 in the participating nodes based on priority associated with the BLE mesh service and availability of multiple neighbor nodes at any point of previous path.

In an embodiment of the present disclosure, the system 100 is configured to automatically reconfigure the BLE mesh network based on availability of the participating nodes.

In an embodiment of the present disclosure, the BLE mesh network is configured by receiving an input from a user.

In an embodiment of the present disclosure, the BLE mesh network is configured by identifying the configuration parameter (e.g., power, network, and the like) suitable for operation of the BLE mesh network based on one of the network configuration values, and default configuration values to meet the service requirements.

In an embodiment of the present disclosure, the system 100 is further configured to map priority of each of the BLE mesh service and impact of each the BLE mesh service based on a mesh performance parameter.

In an embodiment of the present disclosure, each node in the participating nodes maintains information related to each data packet transmitted through each node in the database 108. The information comprises addresses of neighboring nodes, a MIC, retransmission counts, and one of a number overhearing based acknowledgement received from the participating nodes and/or explicit acknowledgements received from the participating nodes.

In an example, in a mega-event facility like amusement park, it is important to know about the status of different rides at a particular time. Quick response is must. But while doing this, power consumption need not be too much, and delay too should be within considerable limits. For this situation, the proposed method would tune to achieve these features by having controlled flooding based synchronized advertisement/scan mechanism.

FIG. 1 illustrates a limited overview of the system 100 but, it is to be understood that other embodiments are not limited thereto. Further, the system 100 can include any number of other hardware or software components communicating with each other. For example, the component can be, but not limited to, a process running in the controller or processor, an object, an executable process, a thread of execution, a program, or a computer. By way of illustration, both an application running on a device and the device itself can be a component.

Figure 2:
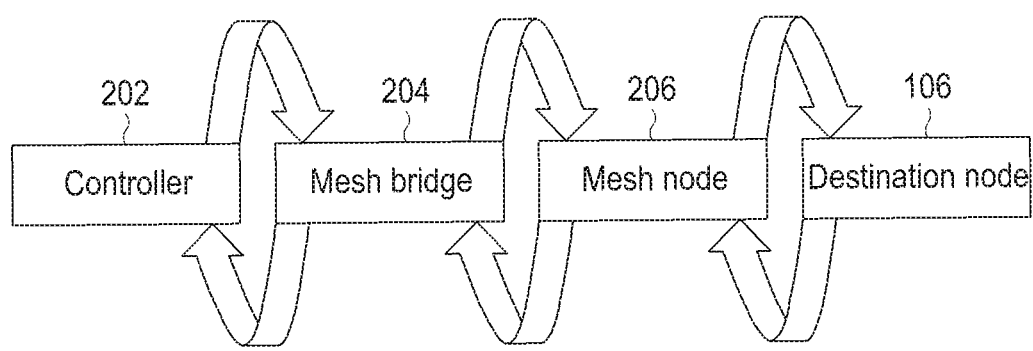
FIG. 2 illustrates a BLE mesh network according to various embodiments of the present disclosure.

FIG. 2 illustrates a BLE mesh network according to various embodiments of the present disclosure.

Referring to FIG. 2, the BLE mesh network includes a controller 202, a mesh bridge 204, a mesh node 206, and the destination node 106. The mesh node 206 can be the relay node. Each node broadcast packets to the neighboring nodes and hope that neighboring nodes will relay packets towards the destination node. Each node broadcasts packets multiple times to insure that each node will reach towards the destination node. The reliable communication for BLE based mesh networks is achieved by exploiting the following techniques.

At least one parameter, such as overhearing of neighbours re-transmission, channel conditions, distance, acknowledgement, and the like, are considered to determine the required number of re-transmissions of a packet to deliver reliably to its final destination.

Initial re-transmission count is determined based on the channel conditions (RSSI and path loss)

The total number of re-transmissions is optimized based on neighbor overhearing and acknowledgements.

Intelligent and optimized re-transmission back-off is provided to reduce interference and packet collision among participating nodes.

Low end-to-end packet latency is achieved by reduced number of packets in the network.

Packet forwarding is optimized based on the neighbor learning.

Figure 3:
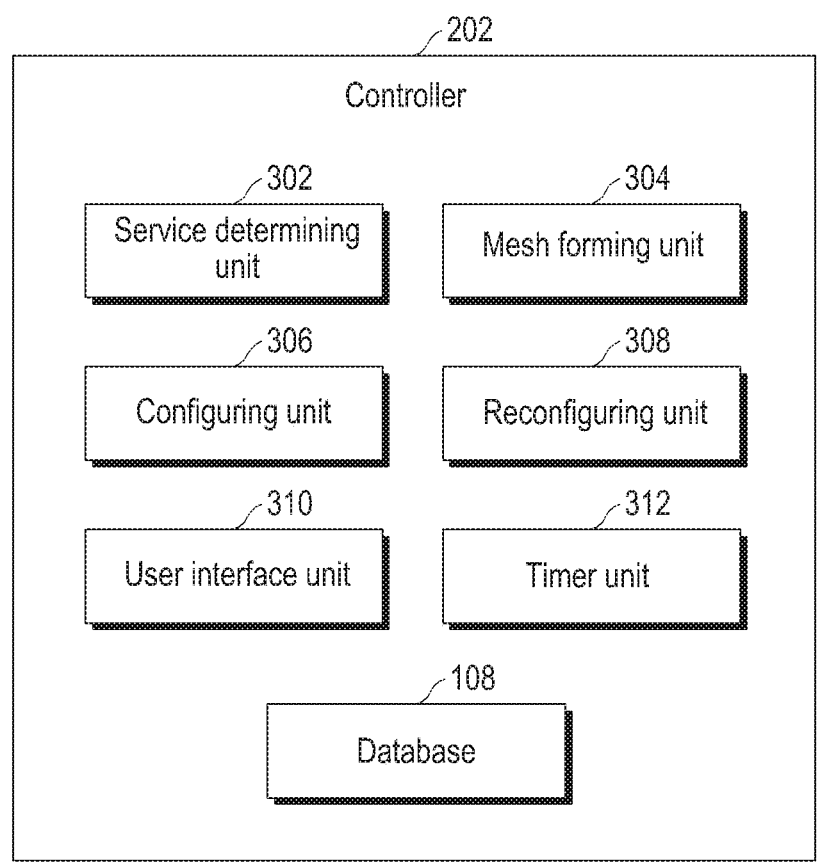
FIG. 3 illustrates various units of an apparatus, i.e., a controller, for dynamically forming a service aware BLE mesh network according to various embodiments of the present disclosure.

FIG. 3 illustrates various units of an apparatus, i.e., a controller, for dynamically forming a service-aware BLE mesh network according to various embodiments of the present disclosure.

Referring to FIG. 3, the controller 202 may include a service determining unit 302, a mesh forming unit 304, a configuring unit 306, a reconfiguring unit 308, a user interface unit 310, and a timer unit 312. The service determining unit 302 is configured to derive the service requirements for the BLE mesh service based on the unique identifier associated with the BLE mesh service. Further, the service determining unit 302 is configured to determine the BLE mesh service to be provided based on at least one BLE parameter.

The mesh forming unit 304 is configured to dynamically form the BLE mesh network by identifying the BLE mesh network based on the determined BLE mesh service, the service requirements and at least one BLE parameter.

The configuring unit 306 is configured to display preference for the role based on the power status, the intent to relay data packets, and for the BLE mesh service of the participating nodes. In an embodiment of the present disclosure, the configuring unit 306 is configured to form the plurality of paths towards the destination node 106 in the participating nodes based on priority associated with the BLE mesh service.

In an embodiment of the present disclosure, the configuring unit 306 is configured to form the BLE mesh network by receiving the input from the user.

In an embodiment of the present disclosure, the configuring unit 306 is configured to form the BLE mesh network by identifying configuration parameters suitable for operation of the BLE mesh network based on either the network configuration values, or default configuration values to meet the service requirements.

In an embodiment of the present disclosure, the configuring unit 306 is configured to map priority of each the BLE mesh service and impact of each the BLE mesh service based on the mesh performance parameter.

The reconfiguring unit 308 is configured to automatically reconfigure the BLE mesh network based on availability of the participating nodes.

The node in the participating nodes maintains information related to each data packet transmitted through each the node in the database 108. The information may include at least one of address of neighboring nodes, a MIC, retransmission counts, and one of a number overhearing based acknowledgements received from the participating nodes and an explicit acknowledgement received from the participating nodes.

The timer unit 312 is configured to perform the neighbor list updating procedure, a neighboring list deletion procedure, and a packet MIC initialization and management.

Although FIG. 3 illustrates units of the controller 202, in other implementations, the controller 202 may include fewer components, different components, differently arranged components, or additional components than depicted in FIG. 3. Additionally or alternatively, at least one component of the controller 202 may perform functions described as being performed by at least one other component of the controller 202.

Hereinafter, the controller 202 may be referred to as an apparatus.

Figure 4:
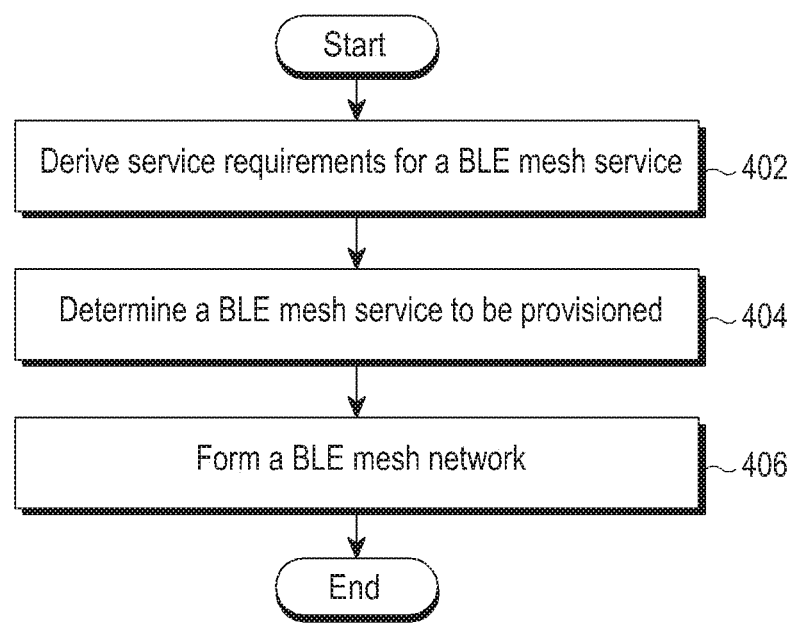
FIG. 4 is a flowchart illustrating a method of an apparatus for dynamically forming a service aware BLE mesh network according to various embodiments of the present disclosure.

FIG. 4 is a flowchart illustrating a method of an apparatus for dynamically forming a service aware BLE mesh network according to various embodiments of the present disclosure.

Referring to FIG. 4, the apparatus may be the controller 202 of FIG. 3.

At operation 402, the apparatus can derive the service requirements for the BLE mesh service based on the unique identifier associated with the BLE mesh service.

In an embodiment of the present disclosure, the service requirements may be derived based on the user preference. In an example, a user can set priority for the BLE mesh service and map the priority of the BLE mesh service with the UUID associated with the BLE mesh service.

In an embodiment of the present disclosure, the service requirements are derived based on a preconfigured setting. In an example, the apparatus can select a default service requirement if there is no user preference.

In an embodiment of the present disclosure, the apparatus allows the service determining unit 302 to derive the service requirements for the BLE mesh service based on the unique identifier associated with the BLE mesh service.

At operation 404, the apparatus can determine the BLE mesh service to be provided based on at least one BLE parameter. In an embodiment of the present disclosure, the apparatus allows the service determining unit 302 to determine the BLE mesh service to be provided based on at least one BLE parameter.

The BLE parameters can be, for example but not limited to, the power status of participating nodes, the priority associated with the BLE mesh service, the number of participating nodes available, the role preferences of the participating nodes, and the like.

At operation 406, the apparatus can dynamically form the BLE mesh network based on the determined BLE mesh service, the service requirements and at least one BLE parameter. In an embodiment of the present disclosure, the apparatus can allow the mesh forming unit 304 to dynamically form the BLE mesh network based on the determined BLE mesh service, the service requirements and at least one BLE parameter.

In an embodiment of the present disclosure, the BLE mesh network is connection-oriented.

In an embodiment of the present disclosure, the BLE mesh network is connection-less.

In an example, service aware BLE mesh network can help to track friends and family in the crowd when the user transmits the broadcast and gets back the response as co-ordinates.

The various actions, acts, blocks, operations, and the like, in the method of FIG. 4 may be performed in the order presented, in a different order or simultaneously. Further, in some embodiments of the present disclosure, some actions, acts, blocks, operations, and the like, may be omitted, added, modified, skipped, and the like, without departing from the scope of the present disclosure.

Figure 5:
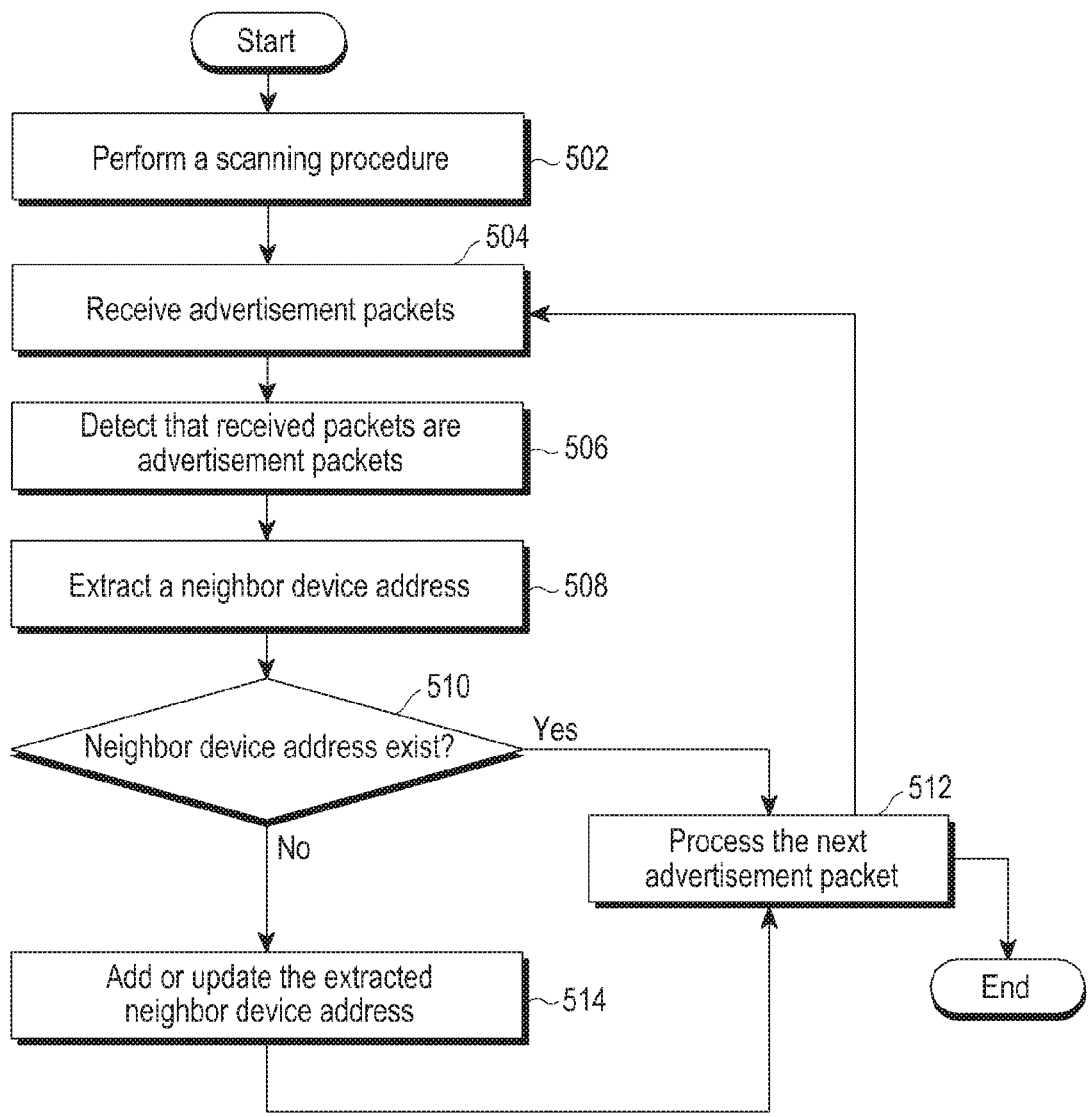
FIG. 5 is a flowchart illustrating a method of an apparatus for performing a neighbor list updating procedure according to various embodiments of the present disclosure.

FIG. 5 is a flowchart illustrating a method of an apparatus for performing a neighbor list updating procedure according to various embodiments of the present disclosure.

Referring to FIG. 5, the apparatus may be the controller 202 of FIG. 2, specifically, the timer unit 312. Basically, the neighbor list will be updated after getting the mesh packets (i.e., BLE mesh service id=0xFEFE) from the neighbors. The neighbor list includes the BLE device address. In an embodiment of the present disclosure, the total number of neighbors supported in the current implementation due to memory constraints is restricted to 32 but is easily extendable.

At operation 502, the apparatus performs a scanning procedure.

At operation 504, the apparatus receives advertisement packets. At operation 506, the apparatus determines (or identifies) whether the received packet is a mesh packet. At operation 508, the apparatus extracts the neighbor device address. At operation 510, the apparatus determines whether a neighbor device address exists in the controller 202. If the neighbor device address exists in the controller, at operation 512, the apparatus processes the next advertisement packet. If the neighbor device address does not exist in the apparatus, at operation 514, the apparatus adds or updates the extracted neighbor device address. After adding or updating the extracted neighbor device address, at operation 512, the apparatus processes the next advertisement packet.

The various actions, acts, blocks, operations, and the like, in the method 500 may be performed in the order presented, in a different order or simultaneously. Further, in some embodiments of the present disclosure, some actions, acts, blocks, operations, and the like, may be omitted, added, modified, skipped, and the like, without departing from the scope of the present disclosure.

Figure 6:
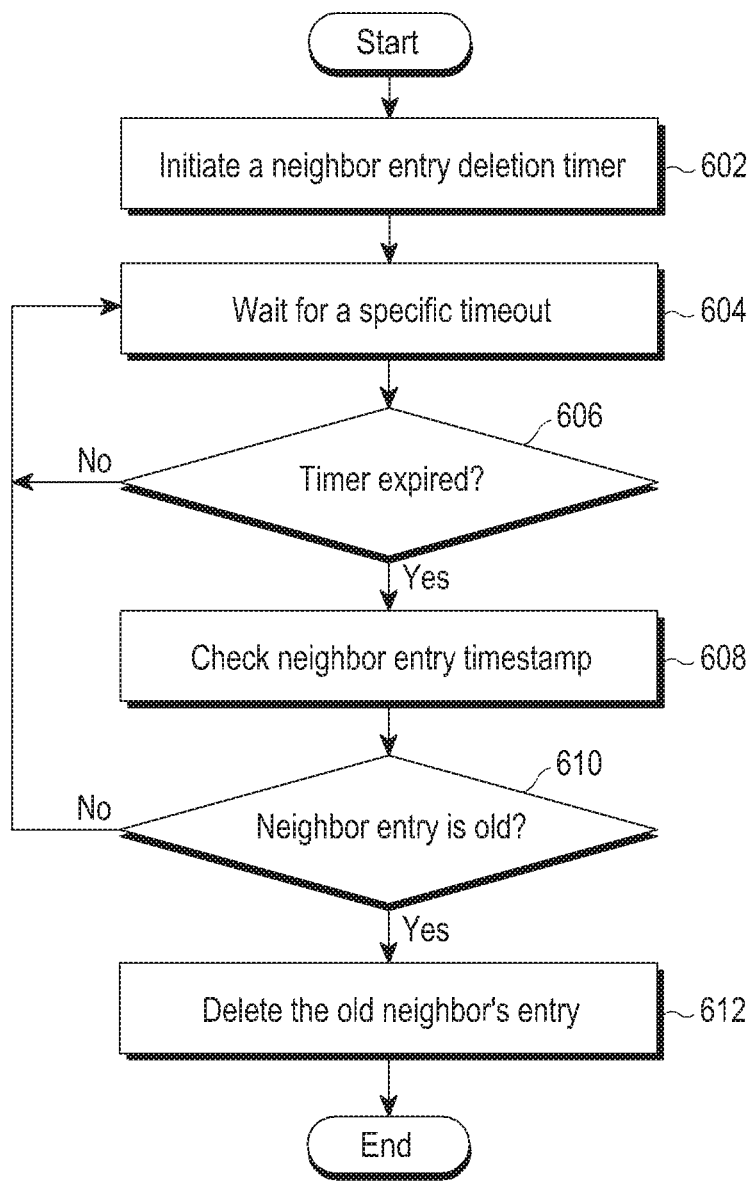
FIG. 6 is a flowchart illustrating a method of an apparatus for performing a neighbor list deletion procedure according to various embodiments of the present disclosure.

FIG. 6 is a flowchart illustrating a method of an apparatus for performing a neighbor list deletion procedure according to various embodiments of the present disclosure.

Referring to FIG. 6, the apparatus may be the controller 202 of FIG. 3, specifically, the timer unit 312.

At operation 602, the apparatus initiates a neighbor entry deletion timer (periodic) during the mesh initialization process. At operation 604, the apparatus waits for a specific timeout. In an embodiment of the present disclosure, the timeout may be fixed to 20 seconds. At operation 606, the apparatus determines whether the neighbor entry deletion time is expired. If the neighbor entry deletion time is expired, at operation 608, the apparatus searches for old neighbor entry in the neighbor's list. If the neighbor entry deletion time is not expired, at operation 604, the apparatus waits for the specific timeout. At operation 610, the apparatus determines whether the neighbor entry is old. In an embodiment of the present disclosure, the old neighbor entry status is identified based on the last packet seen from the neighbor in the neighbor's list. If the neighbor entry is old, at operation 612, the apparatus deletes the old neighbor's entry. In an embodiment of the present disclosure, if the neighbor entry has not been updated for at least last three updates that will be considered as old entry and may be deleted. If the neighbor entry is not old, at operation 604, the apparatus waits for a specific timeout.

The various actions, acts, blocks, operations, and the like, in the method 600 may be performed in the order presented, in a different order or simultaneously. Further, in some embodiments of the present disclosure, some actions, acts, blocks, operations, and the like, may be omitted, added, modified, skipped, and the like, without departing from the scope of the present disclosure.

Figure 7A:
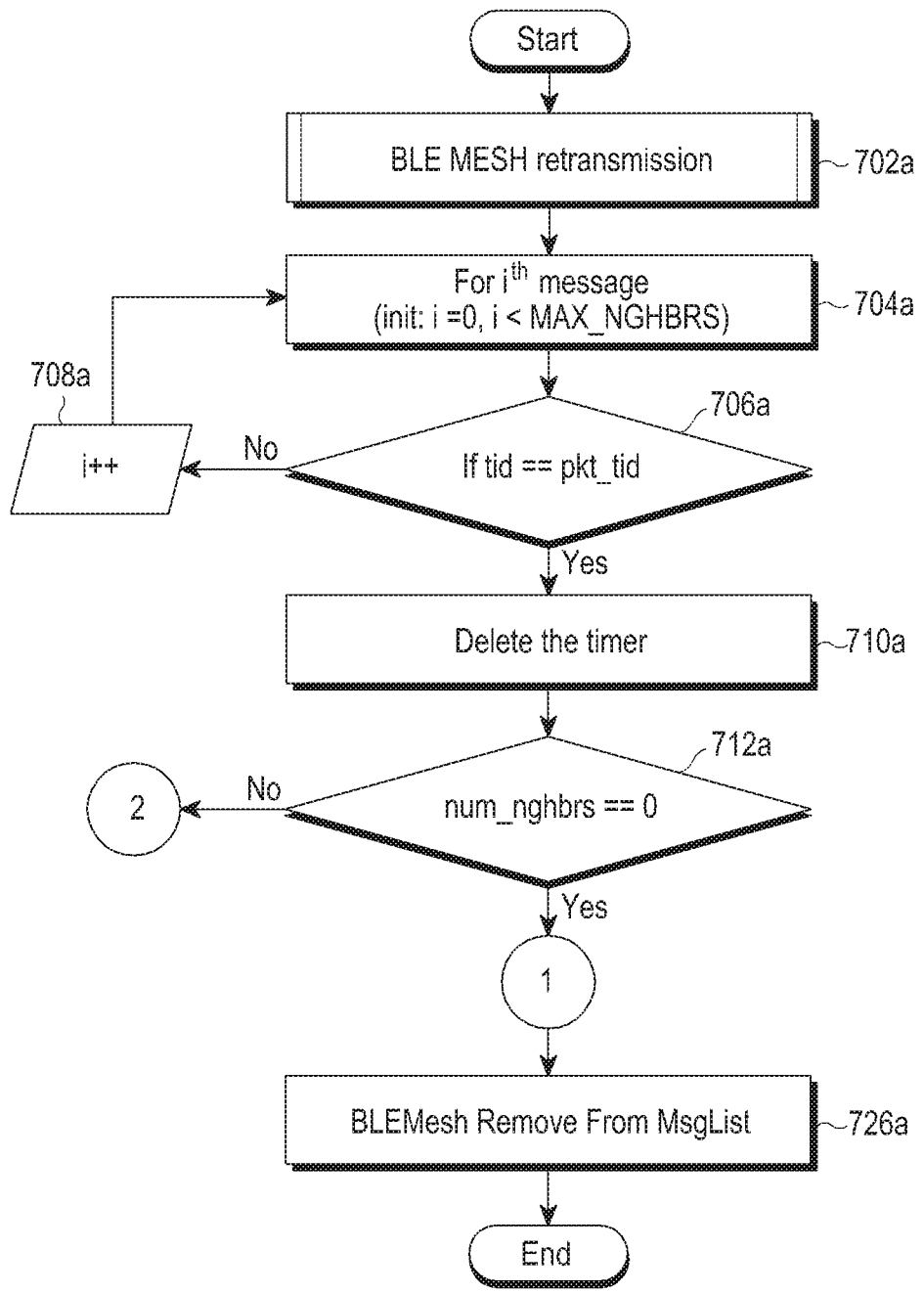
FIGS. 7A and 7B are flowcharts illustrating an overhearing algorithm according to various embodiments of the present disclosure.
Figure 7B:
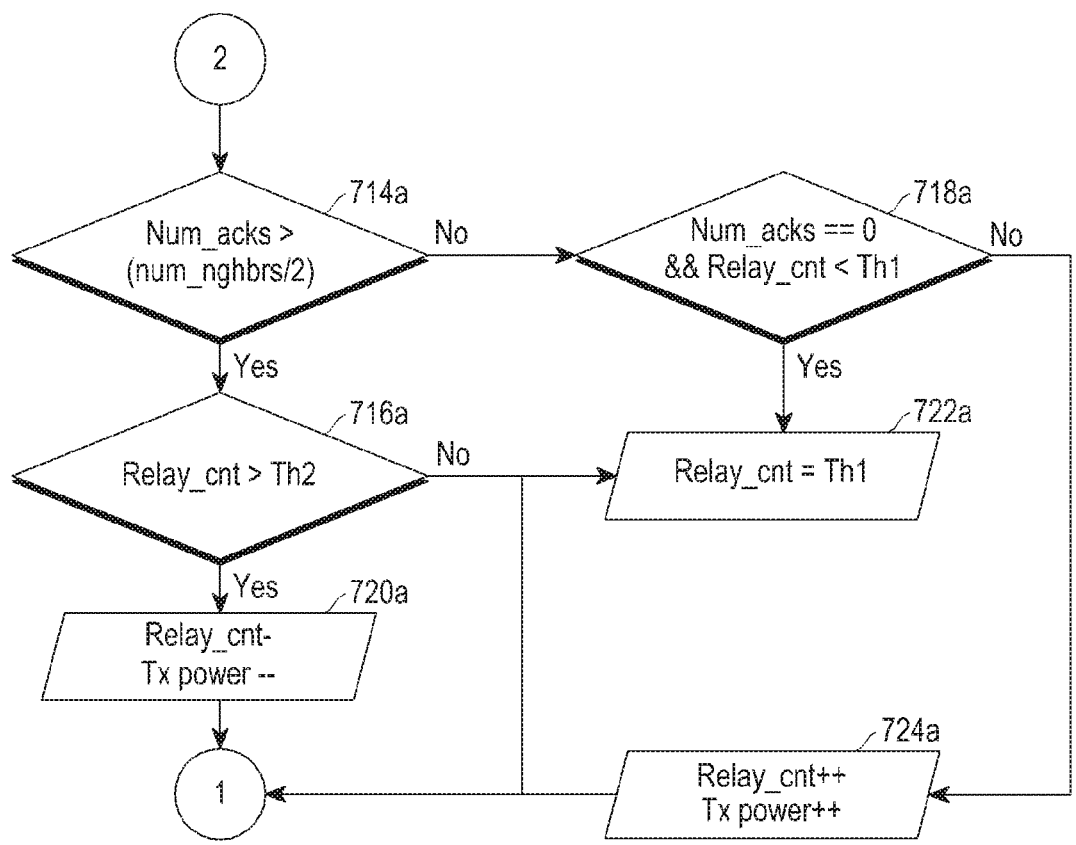

FIGS. 7A and 7B are flowcharts illustrating an overhearing algorithm according to various embodiments of the present disclosure. The apparatus may be the controller 202 of FIG. 3, specifically, the reconfiguring unit 308.

Referring to FIGS. 7A and 7B, at operation 702a, the apparatus performs the BLE mesh retransmission. At operation 704a, the apparatus performs an iteration for $i^{th}$ message (initial: i=0, i<MAX_NGHBRS). At operation 706a, the apparatus determines whether tid is equal to pkt_tid. If the (tid) timer id==received timer id in packet (pkt_tid), at operation 710a, the apparatus deletes the timer value. If the tid is not equal to the pkt_tid, at operation 708a, the apparatus increases i by 1. After deleting the timer value, at operation 712a, the apparatus determines whether num_nghbrs==0. At operation 714a, the apparatus determines whether the Num_acks is greater than (num_nghbrs/2). If the Num_acks is greater than (num_nghbrs/2), at operation 716a, the apparatus determines whether Relay_cnt is greater than Th2 (threshold 2). If the Num_acks is not greater than (num_nghbrs/2), at operation 718a, the apparatus determines whether the Num_acks==0 && Relay_cnt<Th1. If the Relay_cnt is greater than Th2, at operation 720a, the apparatus performs the relay_cnt at TX power. If the Relay_cnt is not greater than Th2, at operation 722a, the apparatus sets the Relay_cnt value. In an embodiment of the present disclosure, the Relay_cnt value may be Th1. If the Num_acks==0 and Relay_cnt<Th1, the apparatus performs the operation 722a. At operation 726a, the apparatus removes the BLE mesh from the message list.

The proposed overhearing algorithm can adapt to the surrounding and adjust the retransmission count/relay accordingly.

The various actions, acts, blocks, operations, and the like, in the method 700a may be performed in the order presented, in a different order or simultaneously. Further, in some embodiments of the present disclosure, some actions, acts, blocks, operations, and the like, may be omitted, added, modified, skipped, and the like, without departing from the scope of the present disclosure.

Figure 7C:
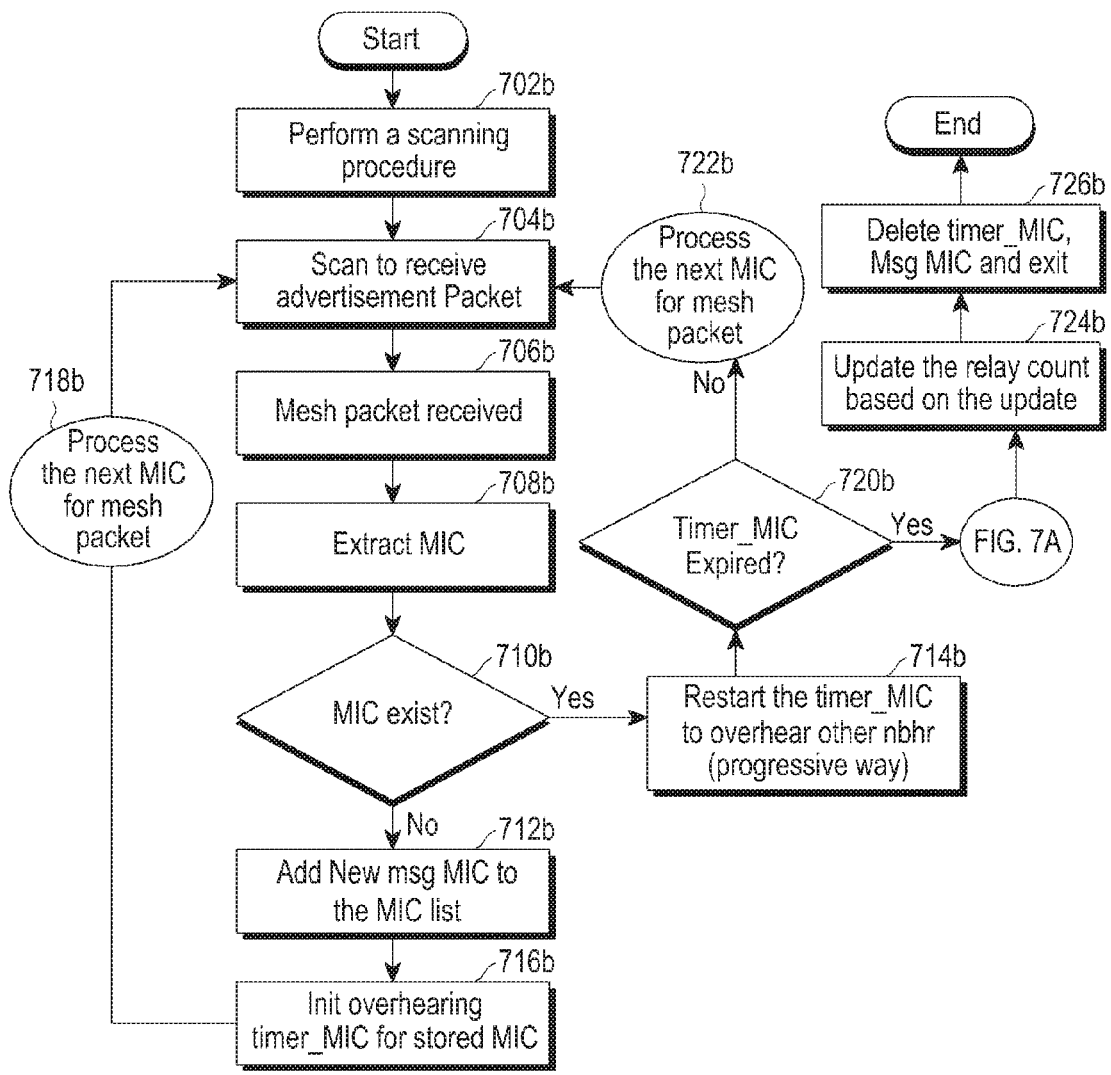
FIG. 7C is a flowchart illustrating a method of an apparatus for performing a packet message integrity check (MIC) initialization and management according to various embodiments of the present disclosure.

FIG. 7C is a flowchart illustrating a method of an apparatus for performing a packet MIC initialization and management according to various embodiments of the present disclosure.

Referring to FIG. 7C, at operation 702b, the apparatus performs the scanning procedure. At operation 704b, the apparatus receives advertisement packets based on the scanning procedure. At operation 706b, the apparatus determines the received packet to be the mesh packet. At operation 708b, the apparatus extracts the MIC. For example, the apparatus can extract a result of the MIC. At operation 710b, the apparatus determines whether the MIC exists in the apparatus. If the MIC exists in the apparatus, at operation 714b, the apparatus restarts the timer to overhear other neighbor device addresses. If the MIC does not exist in the apparatus, at operation 712b, the apparatus adds the new message's MIC to the MIC list. At operation 716b, the apparatus initiates the overhearing timer_MIC for the stored MIC. At operation 718b, the apparatus processes the next MIC for the mesh packet. After restarting the timer to overhear other neighbor device address, at operation 720b, the apparatus determines whether the timer_MIC is expired. If the timer is expired without overhearing or explicit acknowledgment, the packet is retransmitted else the packet does not need to be retransmitted. At operation 722b, the apparatus may process the next MIC for the mesh packet.

Msg MIC is a unique message identifier and may be stored in the MIC list. For each unique MIC, a new timer named Timer_MIC will be created and will be used for overhearing. Timer_MIC will be rescheduled progressively to capture the neighbor's ACK. After Timer_MIC expires, it will call relay count update algorithm at operation 724b. At operation 726b, Timer_MIC and msg MIC will be deleted on the timer expiry. MIC_Timer was being expired without overhearing any ACK from the neighbor and relay count was being updated with maximum value (Relay_cnt=Th1) and is continuously increased by 1 and bypassing all the available checks.

The various actions, acts, blocks, operations, and the like, in the method 700b may be performed in the order presented, in a different order or simultaneously. Further, in some embodiments of the present disclosure, some actions, acts, blocks, operations, and the like, may be omitted, added, modified, skipped, and the like, without departing from the scope of the present disclosure.

Figure 8:
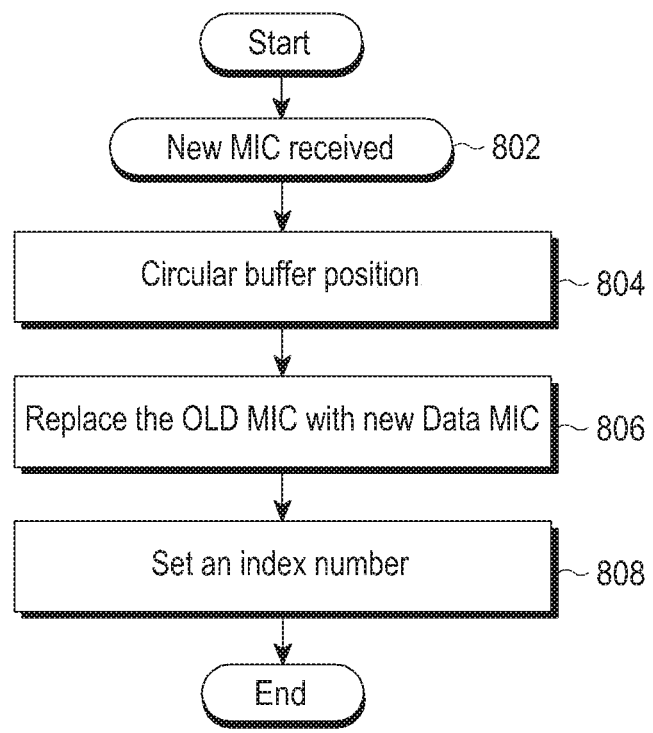
FIG. 8 is a flowchart illustrating a method of an apparatus for performing a MIC deletion from a list according to various embodiments of the present disclosure.

FIG. 8 is a flowchart illustrating a method of an apparatus for performing a MIC deletion from a list according to various embodiments of the present disclosure. The apparatus may be the controller 202 of FIG. 3.

Referring to FIG. 8, at operation 802, the apparatus receives a new MIC. At operation 804, the apparatus stores the received MIC in a circular buffer position (i.e., circular list). At operation 806, the apparatus replaces the old MIC with a new MIC when there is a buffer overflow in the circular list. At operation 808, the apparatus sets an index number for the new MIC.

The various actions, acts, blocks, operations, and the like, in the method 800 may be performed in the order presented, in a different order or simultaneously. Further, in some embodiments of the present disclosure, some actions, acts, blocks, operations, and the like, may be omitted, added, modified, skipped, and the like, without departing from the scope of the present disclosure.

Figure 9:
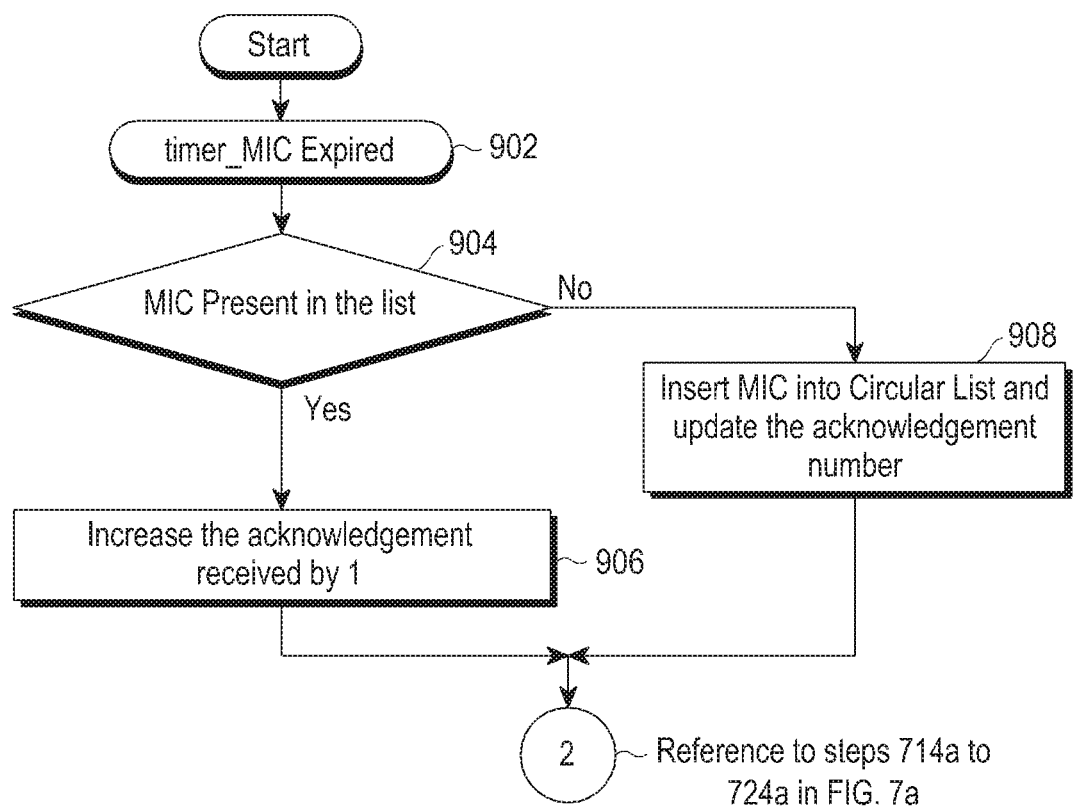
FIG. 9 is a flowchart illustrating a method of an apparatus for providing a recent MIC list according to various embodiments of the present disclosure.

FIG. 9 is a flowchart illustrating a method of an apparatus for providing a recent MIC list according to various embodiments of the present disclosure. The apparatus may be the controller 202 of FIG. 3.

Referring to FIG. 9, at operation 902, the apparatus detects that the timer is expired. In an embodiment of the present disclosure, the mesh nodes are not able to overhear acknowledgements from their neighbors within a fixed interval. The fixed interval is varying based on interference and node's schedule (i.e., advertisement, scan state, and the like). At operation 904, the apparatus determines whether the MIC is present in the list. If the MIC is present in the list, at operation 906, the apparatus increases the acknowledgement reception count by 1. If the MIC is not present in the list, at the operation 908, the apparatus inserts the MIC into the circular list and updates the acknowledgement number in the circular list. After the operations 906 and 908 are executed, the apparatus continuously performs the operations 714a to 724a as described in FIG. 7A.

Figure 10:
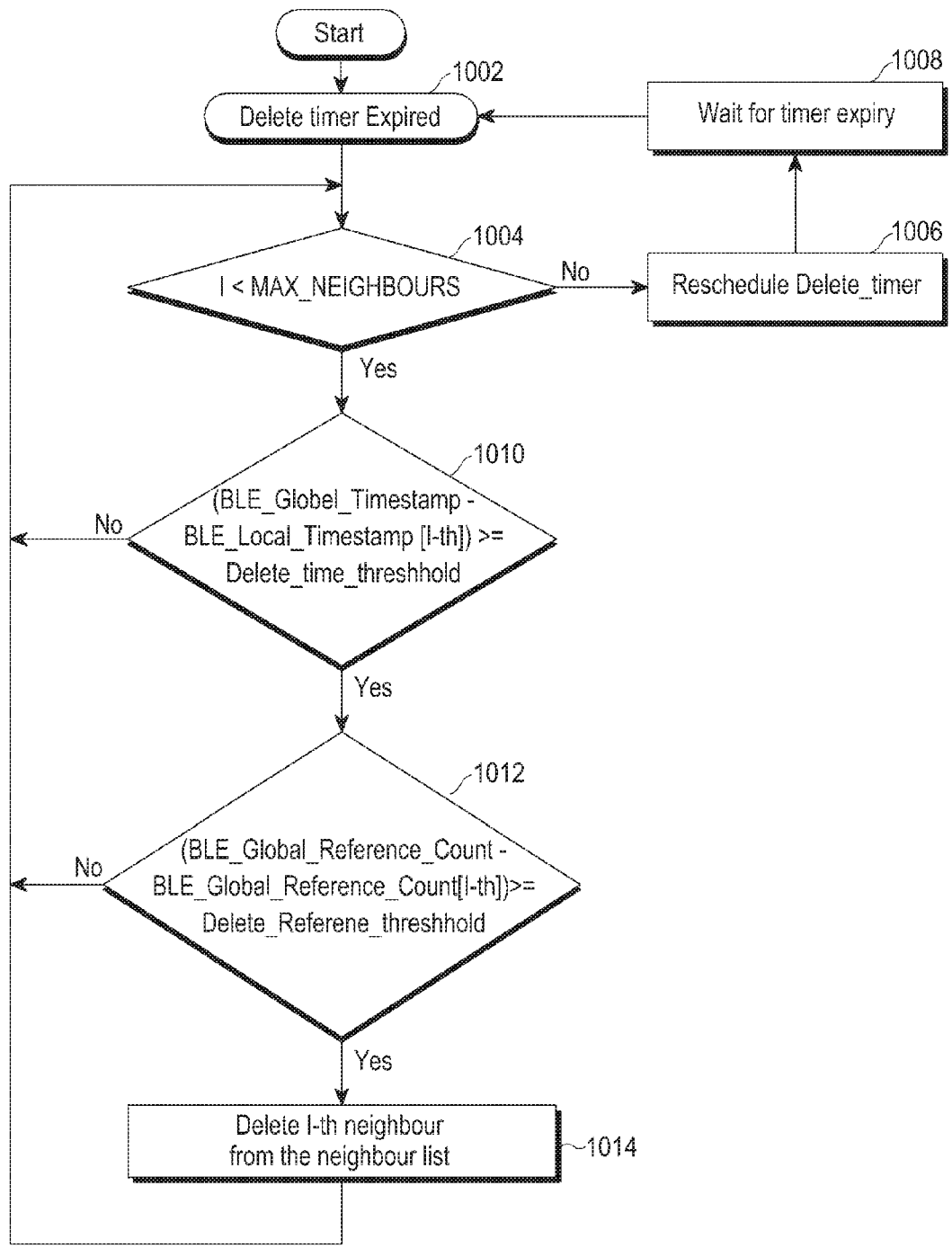
FIG. 10 is a flowchart illustrating a method of an apparatus for performing a neighbour entry deletion procedure according to various embodiments of the present disclosure.

FIG. 10 is a flowchart illustrating a method of an apparatus for performing a neighbour entry deletion procedure according to various embodiments of the present disclosure. The apparatus may be the controller 202 of FIG. 3.

Referring to FIG. 10, at operation 1002, the apparatus deletes the timer expired value. At operation 1004, the apparatus determines whether the 'I' is less than MAX_NEIGHBOURS. If the 'I' is less than MAX_NEIGHBOURS, at operation 1010, the apparatus determines whether the (BLE_Globel_Timestamp−BLE_Local_Timestamp [$I^{th}$])>=Delete_time_threshhold. If the 'I' is not less than MAX_NEIGHBOURS, at operation 1006, the apparatus reschedules the deletion timer value. At operation 1008, the apparatus waits for timer expiry. If the (BLE_Globel_Timestamp−BLE_Local_Timestamp [Ith]) is equal to or higher than Delete_time_threshhold, at operation 1012, the apparatus determines whether the (BLE_Global_Reference_Count−BLE_Global_Reference_Count [I-th])>=Delete_Reference_threshhold. If the (BLE_Global_Reference_Count−BLE_Global_Reference_Count [I-th])>=Delete_Reference_threshhold, at operation 1014, the apparatus deletes I-th neighbour from the neighbour list. If the (BLE_Global_Reference_Count−BLE_Global_Reference_Count [I-th]) is not greater than or equal to Delete_Reference_threshhold, at operation 1004, the apparatus determines whether the I is less than MAX_NEIGHBOURS.

The BLE mesh network is event based and it is possible to not have continuous packet flow. Hence, it may be not possible to delete any entry only based on the timestamp (similar to traditional routing protocols). A mesh entry may be old but there is possibility that mesh network does not receive any data event between this time period.

The global timestamp (BLE_Globel_Timestamp) implies the last time when a mesh node receives any unique ACK from its neighbor. The global reference count (BLE_Global_Reference_Count) implies the number of times by which a unique ACK is received from its all neighbors by a mesh node. A local timestamp (BLE_Local_Timestamp) implies the last time when a mesh node receives any unique ACK from a particular neighbor. The local reference count (BLE_Local_Reference_Count) implies the number of times by which a unique ACK is received by a mesh node from its specific node.

In an embodiment according to FIG. 10, in initiation (Init), a deletion timer "Nbhr_del_timer_id" will be created during mesh node initialization and it will be scheduled periodically after each "Del_timer_timeout".

In an embodiment according to FIG. 10, on timer expiry: the delete timer will check a neighbor list and will check the outdated neighbor entries based on the following rules.

The various actions, acts, blocks, operations, and the like, in the method 1000 may be performed in the order presented, in a different order or simultaneously. Further, in some embodiments of the present disclosure, some actions, acts, blocks, operations, and the like, may be omitted, added, modified, skipped, and the like, without departing from the scope of the present disclosure.

Figure 11:
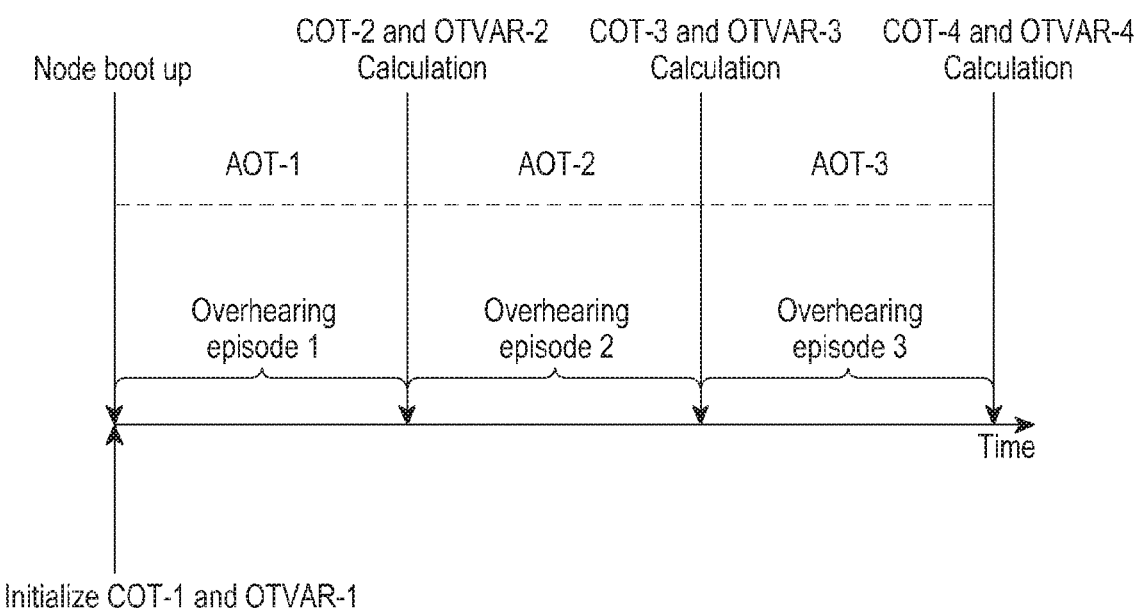
FIG. 11 illustrates a timing diagram of an overhearing timer and seed relay count according to various embodiments of the present disclosure.

FIG. 11 illustrates a timing diagram of an overhearing timer and seed relay count according to various embodiments of the present disclosure.

---

Algorithm: it will run during mesh device boot-up
define Max_Relay_Count 6
define Min_Relay_Count 2

Pseudo Code:
Step1: Default Initialization at startup
    Relay_count= Max_Relay_Count
Step2: After startup, mesh node (M) will start observing "service advertisement packets" from its neighbor and maintain the following list (this process will run for "t" time e.g. 1 second).

| Neighbor | RSSI (packet received) | TX power (packet received) | Path loss |
|---|---|---|---|
| XX.XX.XX.XX.XX.XX | −60 (dBm) | +4 (dBm) | +64 dB. |
| YY.YY.YY.YY.YY.YY | −62 (dBm) | +5 (dBm) | +67 dB. |

Path loss = |Tx Power Level − RSSI|
    (The one with the highest path loss value have highest probability of packet loss).
Step3: Mesh node (M) calculates the max "Path loss" and does the following calculation,
    MAX_PATH_LOSS=max (Path loss (XX.XX.XX.XX.XX.XX), Path loss (YY.YY.YY.YY.YY.YY.YY))
Step4:
    if (MAX_PATH_LOSS >75 dB)
    {
        Relay_count=max_Relay_Count;
    }
    Else
    {
        if (60 dB <=MAX_PATH_LOSS <=75 dB)
        {
          Relay_count=max_Relay_Count−2;
        }
        Else
        {
          if (60 dB >MAX_PATH_LOSS)
          {
            Relay_count= Min_Relay_Count;
          }
        }
    }

-continued

```
Algorithm: it will run during mesh device boot-up
    #define Max_Relay_Count 6
    #define Min_Relay_Count 2
```

Figure 12:
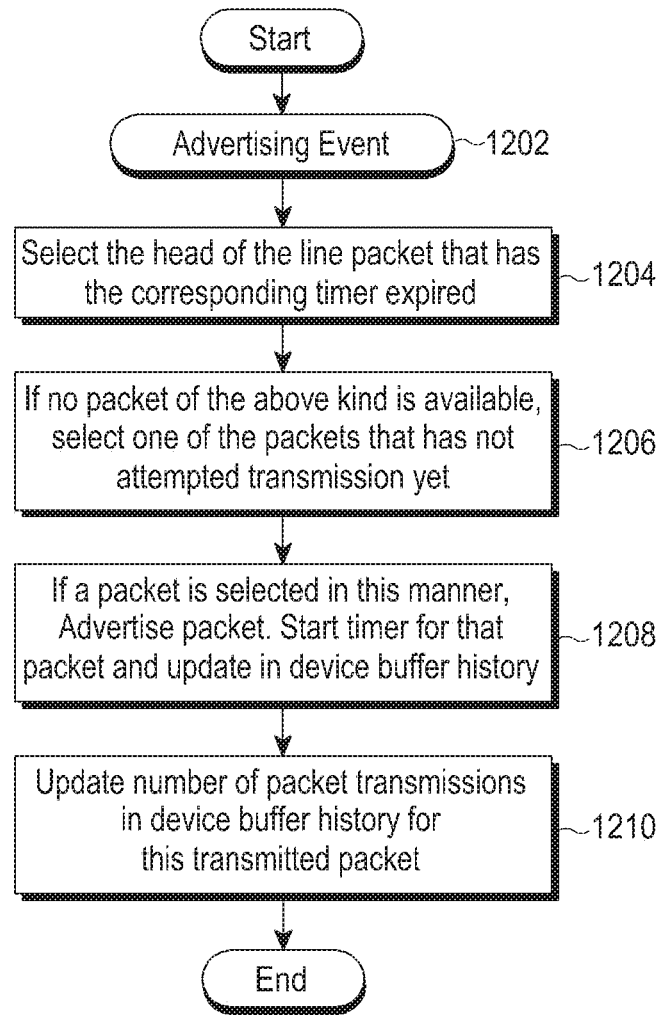
FIG. 12 is a flowchart illustrating a method of an apparatus for performing an advertising event according to various embodiments of the present disclosure.

Note: We have used some numeric values; it will be modified during implementation and testing.
    Overhearing timeout (OT) calculation:
    Overhearing mechanism uses an overhearing timer to overhear retransmission of same packets (it is treated as overhearing ACK) from its neighbors, This timer will expire after overhearing timeout (OT). Below algorithm determine the value of OT in adoptive manner.
        Parameters:
            IOT    : Initial OT (Fixed value, e.g. 3 seconds)
            COT   : Current OT (measured)
            AOT   : Actual OT for overhearing all the ACKs from neighbors
                  Note: We will have the support of progressive timer scheduling to measure the actual
                  timeout (it will be the summation of all progressive scheduled timeout).
        OTVAR: Variance in COT and ACT during next overhearing episode.
    Algorithm:
        Step-1: During node boot up, a mesh node must set.
            COT=IOT;
            OTVAR=IOT/2;
        Step-2: When a subsequent COT measurement is made, a mesh node must set,
            OTVAR = variance In Value (COT, AOT)
            CTO=AOT
            CTO=CTO + (or −) OTVAR
        Step-3: Next Overhearing timer will be set with COT timeout on reception of next unique MIC/Packets FIG. 12 is a flowchart illustrating a method of an apparatus for performing an advertising event according to various embodiments of the present disclosure. The apparatus may be the controller 202 of FIG. 3.

Referring to FIG. 12, at operation 1202, the apparatus performs an advertising event. At operation 1204, the apparatus selects a head of the line of packets that has the corresponding timer expired. At operation 1206, the apparatus selects one of the packets that has not attempted transmission yet, if no timeout packets are available. At operation 1208, the apparatus advertises the packet, starts the timer for the corresponding packet and updates a buffer history of the apparatus (i.e., a controller buffer history) if the packet is selected. At operation 1210, the apparatus updates the number of times of packet transmissions in a buffer history of the apparatus for the transmitted packet.

In an embodiment of the present disclosure, each mesh device maintains the following lists:
Queue of to-be-transmitted packets
The queue would be either generated within the node, or could be for relaying
For each such packet in the queue, the node maintains:
The corresponding MIC
The number of transmissions attempted
The number of overhearing-based or explicit acknowledgements received The various actions, acts, blocks, operations, and the like, in the method 1200 may be performed in the order presented in a different order or simultaneously. Further, in some embodiments of the present disclosure, some actions, acts, blocks, operations, and the like, may be omitted, added, modified, skipped, and the like, without departing from the scope of the present disclosure.

Figure 13:
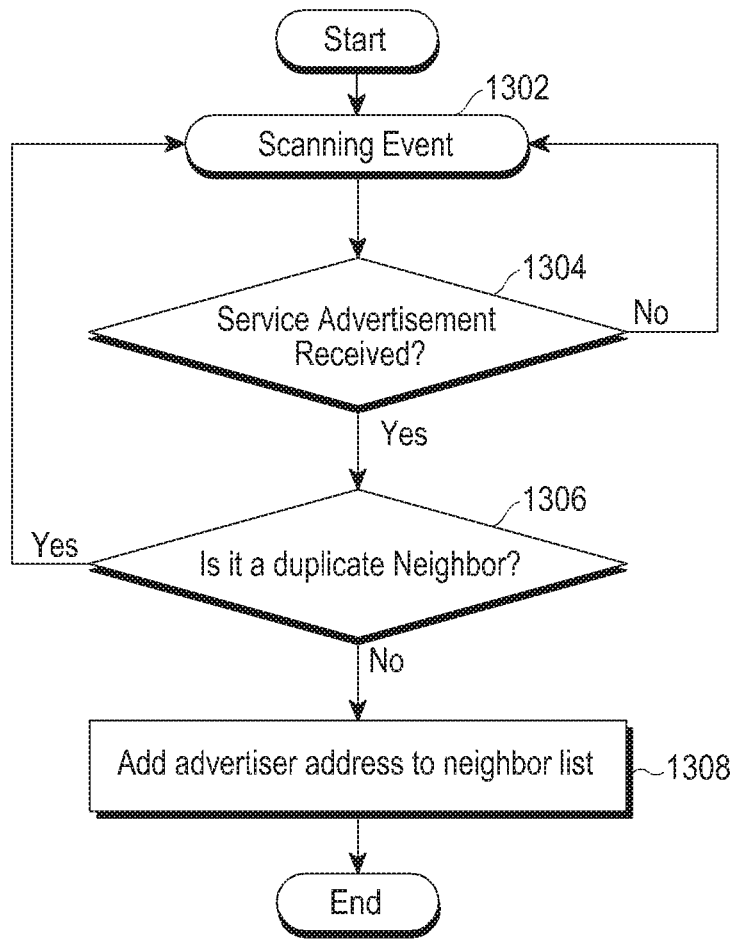
FIG. 13 is a flowchart illustrating a method of an apparatus for generating a neighbor list according to various embodiments of the present disclosure.

FIG. 13 is a flowchart illustrating a method of an apparatus for generating a neighbor list according to various embodiments of the present disclosure. The apparatus may be the controller 202 of FIG. 3.

Referring to FIG. 13, at operation 1302, the apparatus performs the scanning event. At operation 1304, the apparatus determines whether the BLE mesh service advertisement is received.

If the BLE mesh service advertisement is received, at operation 1306, the apparatus determines whether the neighbor entry is already present in the list i.e., the neighbor entry is a duplicate entry. If the BLE mesh service advertisement is not received, at operation 1302, the apparatus performs the scanning event.

If the neighbor is already present in the list, at operation 1302, the apparatus performs the scanning event. If the neighbor is not present in neighbor list, at operation 1308, the apparatus adds an advertiser address to a neighbor list. For example, the advertiser may imply a subject which performs advertisement.

The various actions, acts, blocks, operations, and the like, in the method 1300 may be performed in the order presented, in a different order or simultaneously. Further, in some embodiments of the present disclosure, some actions, acts, blocks, operations, and the like, may be omitted, added, modified, skipped, and the like, without departing from the scope of the present disclosure.

Figure 14:
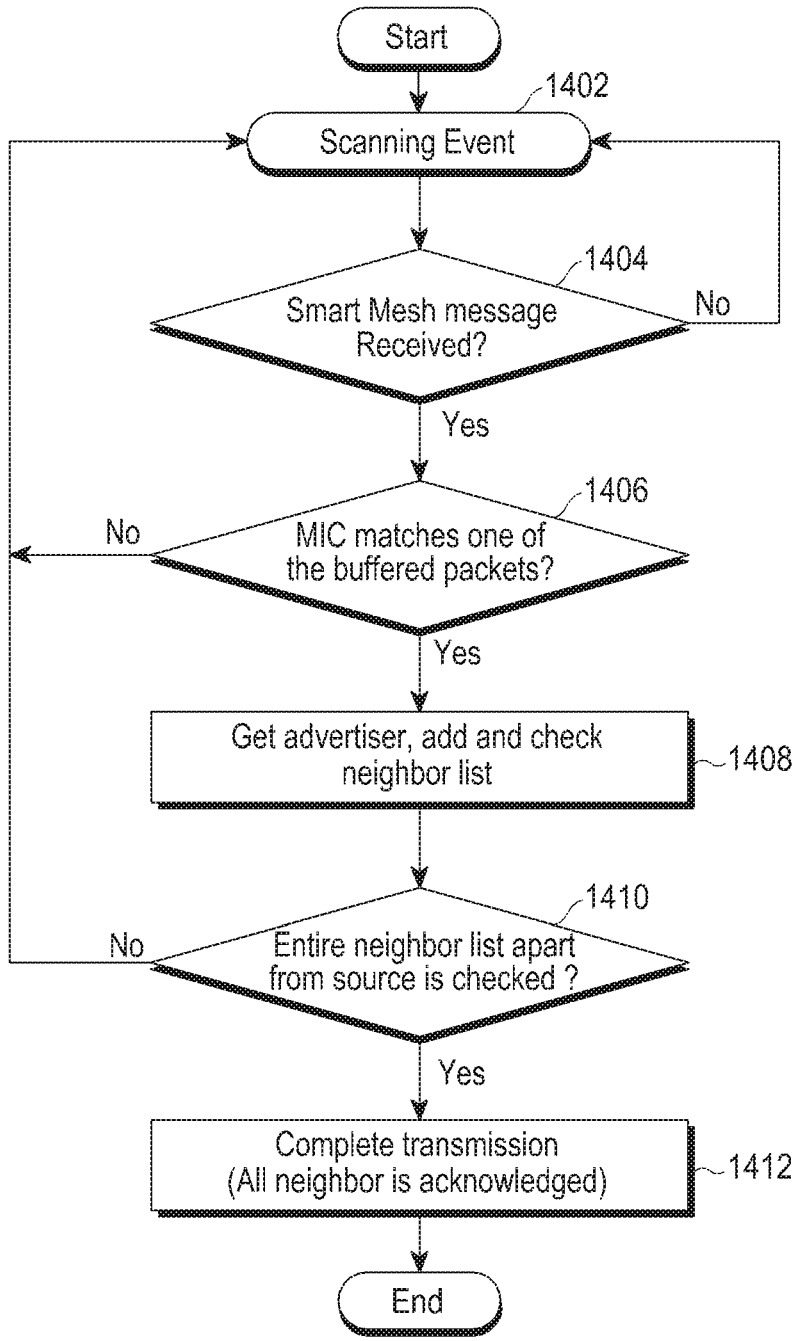
FIG. 14 is a flowchart illustrating a method of an apparatus for representing a neighbor list management according to various embodiments of the present disclosure.

FIG. 14 is a flowchart illustrating a method of an apparatus for representing a neighbor list management according to various embodiments of the present disclosure. The apparatus may be the controller 202 of FIG. 3.

Referring to FIG. 14, at operation 1402, the apparatus performs the scanning event. At operation 1404, the apparatus determines whether a smart mesh message is received. If the smart mesh message is not received, at operation 1402, the apparatus performs the scanning event.

If the smart mesh message is received, at operation 1406, the apparatus determines whether the MIC matches one of the buffered packets. If the MIC does not match one of the buffered packets, at operation 1402, the apparatus performs the scanning event.

If the MIC matches one of the buffered packets, at operation 1408, the apparatus gets an advertiser, adds and checks the neighbor list. At operation 1410, the apparatus determines whether the entire neighbor list is apart from source. If the entire neighbor list is not apart from source, at operation 1402, the apparatus performs the scanning event. If the entire neighbor list is apart from source, at operation

1412, the apparatus completes the transmission process (i.e., all neighbors have acknowledged).

The various actions, acts, blocks, operations, and the like, in the method 1400 may be performed in the order presented, in a different order or simultaneously. Further, in some embodiments of the present disclosure, some actions, acts, blocks, operations, and the like, may be omitted, added, modified, skipped, and the like, without departing from the scope of the present disclosure.

Figure 15:
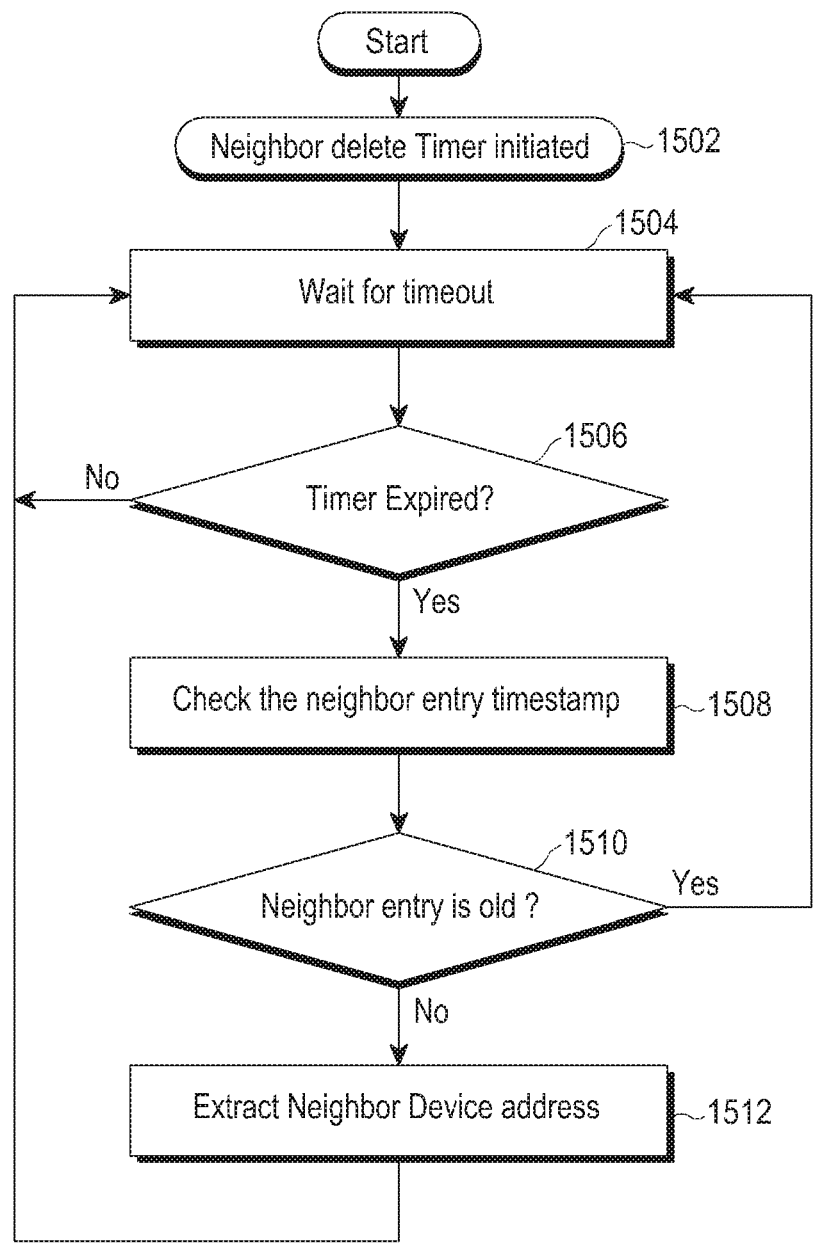
FIG. 15 is a flowchart illustrating a method of an apparatus for performing a neighbor entry list updating procedure according to various embodiments of the present disclosure.

FIG. 15 is a flowchart illustrating a method of an apparatus for performing a neighbor entry list updating procedure according to various embodiments of the present disclosure. The apparatus may be the controller 202 of FIG. 3.

Referring to FIG. 15, at operation 1502, the apparatus initiates the neighbor entry deletion timer (periodic) during the mesh initialization process. At operation 1504, the apparatus waits for the specific timeout. In an embodiment of the present disclosure, the timeout will be fixed to 20 seconds. At operation 1506, the apparatus determines whether the neighbor entry deletion time is expired. If the neighbor entry deletion time is expired, at operation 1508, the apparatus searches for old neighbor entry in the neighbor's list. If the neighbor entry deletion time is not expired, at operation 1504, the apparatus waits for the specific timeout. At operation 1510, the apparatus determines whether the neighbor entry is old. In an embodiment of the present disclosure, the old neighbor entry status is determined based on the last packet seen from the neighbor in the neighbor's list. If the neighbor entry is not old, at operation 1512, the apparatus extracts the neighbor device address. If the neighbor entry is old, at operation 1504, the apparatus waits for the specific timeout.

The various actions, acts, blocks, operations, and the like, in the method 1500 may be performed in the order presented, in a different order or simultaneously. Further, in some embodiments of the present disclosure, some actions, acts, blocks, operations, and the like, may be omitted, added, modified, skipped, and the like, without departing from the scope of the present disclosure.

Figure 16:
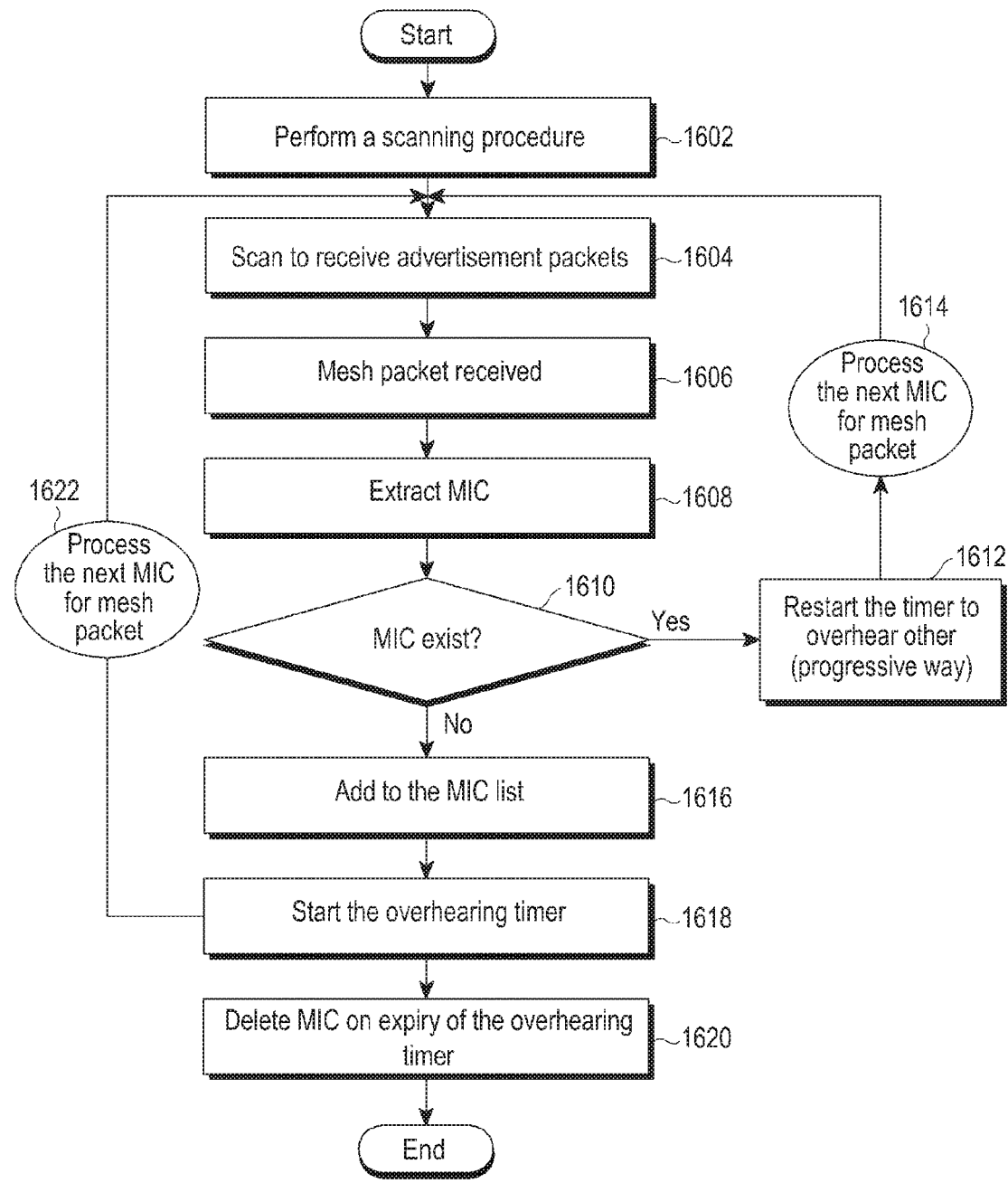
FIG. 16 is a flowchart illustrating a method of an apparatus for performing a packet MIC list initialization and management according to various embodiments of the present disclosure.

FIG. 16 is a flowchart illustrating a method of an apparatus for performing a packet MIC list initialization and management according to various embodiments of the present disclosure. The apparatus may be the controller 202 of FIG. 3.

Referring to FIG. 16, at operation 1602, the apparatus performs the scanning procedure. At operation 1604, the apparatus receives the advertisement packets. At operation 1606, the apparatus receives the mesh packets. At operation 1608, the apparatus extracts the MIC. At operation 1610, the apparatus determines whether the MIC exists in the apparatus. If the MIC exists in the apparatus, at the operation 1612, the apparatus restarts the timer to overhear other neighbors in a progressive way. At operation 1614, the apparatus processes the next MIC for the mesh packet.

If the MIC does not exist in the apparatus, at operation 1616, the apparatus adds the MIC in the MIC list. At operation 1618, the apparatus starts the overhearing timer. In an embodiment of the present disclosure, at operation 1620, the apparatus deletes the MIC on expiry of the overhearing timer after starting the overhearing timer. In another embodiment of the present disclosure, at operation 1622, the apparatus processes the next MIC for the mesh packet after starting the overhearing timer.

The various actions, acts, blocks, operations, and the like, in the method 1600 may be performed in the order presented, in a different order or simultaneously. Further, in some embodiments of the present disclosure, some actions, acts, blocks, operations, and the like, may be omitted, added, modified, skipped, and the like, without departing from the scope of the present disclosure.

Figure 17:
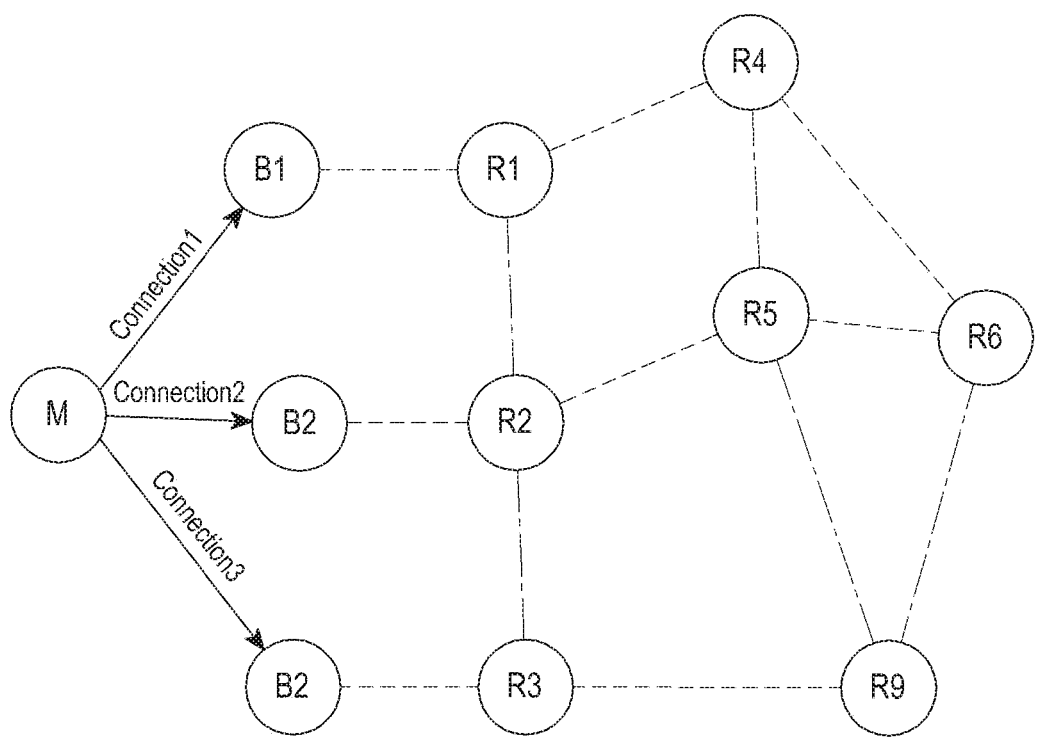
FIG. 17 illustrates a multi-bridge and multi-path topology according to various embodiments of the present disclosure.

FIG. 17 illustrates a multi-bridge and multi-path topology according to various embodiments of the present disclosure.

Referring to FIG. 17, each Node (e.g., a master node (M), a bridge node (B), and a relay node (R)) maintains the neighbor list information. The neighbor list information is periodically shared with the master controller. After sharing the neighbor list information, the master controller maintains optimal path information based on hop count/RSSI. Based on hop count/RSSI, the master controller selects a bridge node for reaching the destination node via the optimal path. The bridge node broadcasts the information towards the destination node. The bridge node overhears only from the optimal path nodes and takes decision of retransmission as per overhearing algorithm. Each node updates the path Information of the last node overheard from the previous node. The bridge node broadcasts the optimal path updates.

Figure 18:
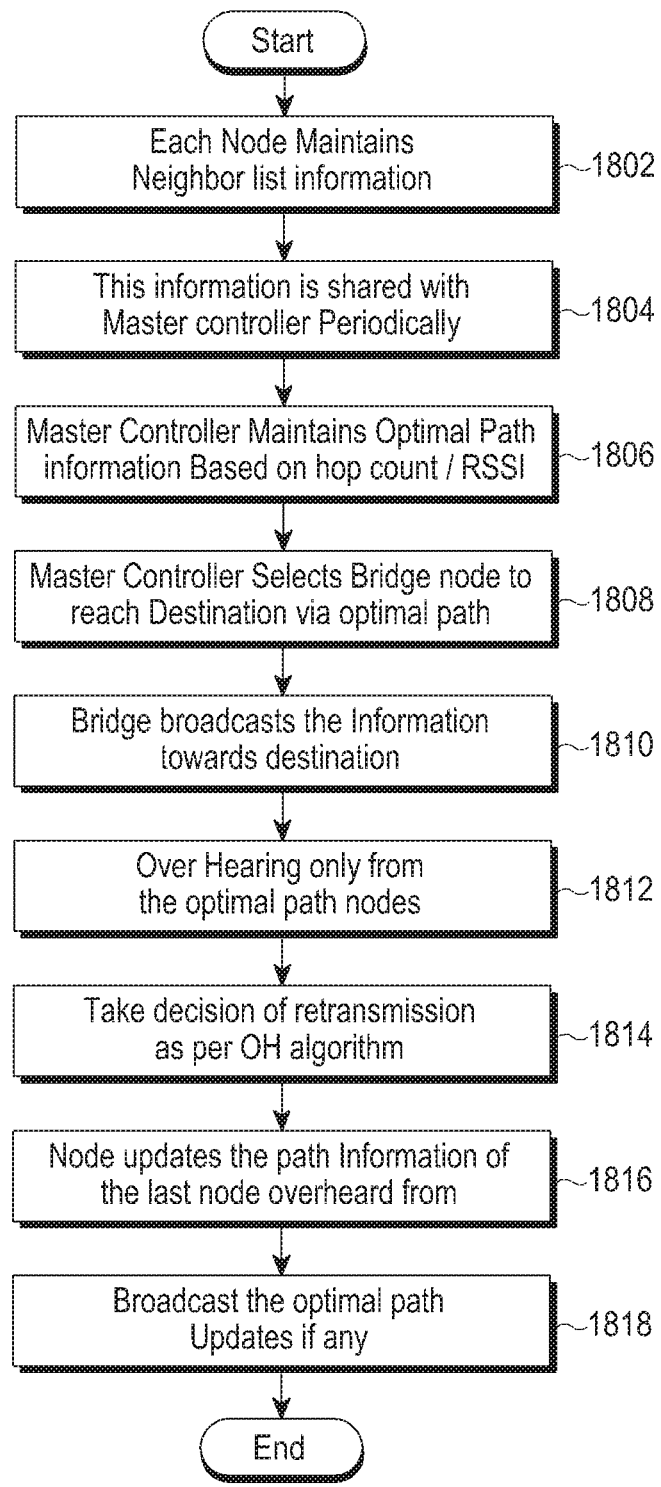
FIG. 18 is a flowchart illustrating a method of an apparatus for creating a multi-bridge and multi-path topology according to various embodiments of the present disclosure.

FIG. 18 is a flowchart illustrating a method of an apparatus for creating a multi-bridge and multi-path topology according to various embodiments of the present disclosure. The apparatus may be the controller 202 of FIG. 3.

Referring to FIG. 18, at operation 1802, the apparatus maintains the neighbor list information by each node. At operation 1804, the apparatus shares the neighbor list information with the master controller periodically. At operation 1806, the apparatus maintains the optimal path information, by the master controller, based on the hop count/RSSI. At operation 1808, the apparatus selects the bridge node to reach the destination node via the optimal path by the master controller. At operation 1810, the apparatus broadcasts the information towards the destination node by the bridge node. At operation 1812, the apparatus performs the overhearing only from the optimal path nodes. At operation 1814, the apparatus takes the decision of retransmission as per the overhearing algorithm. At operation 1816, the apparatus updates the path information of the last node overheard from the previous node. At operation 1818, the apparatus broadcasts the optimal path updates.

Based on the RSSI information of the apparatus, the apparatus can estimate its distance from the electronic device and intelligently identify the transmission count value and re-broadcast accordingly.

The various actions, acts, blocks, operations, and the like, in the method 1800 may be performed in the order presented, in a different order or simultaneously. Further, in some embodiments of the present disclosure, some actions, acts, blocks, operations, and the like, may be omitted, added, modified, skipped, and the like, without departing from the scope of the present disclosure.

Figure 19A:
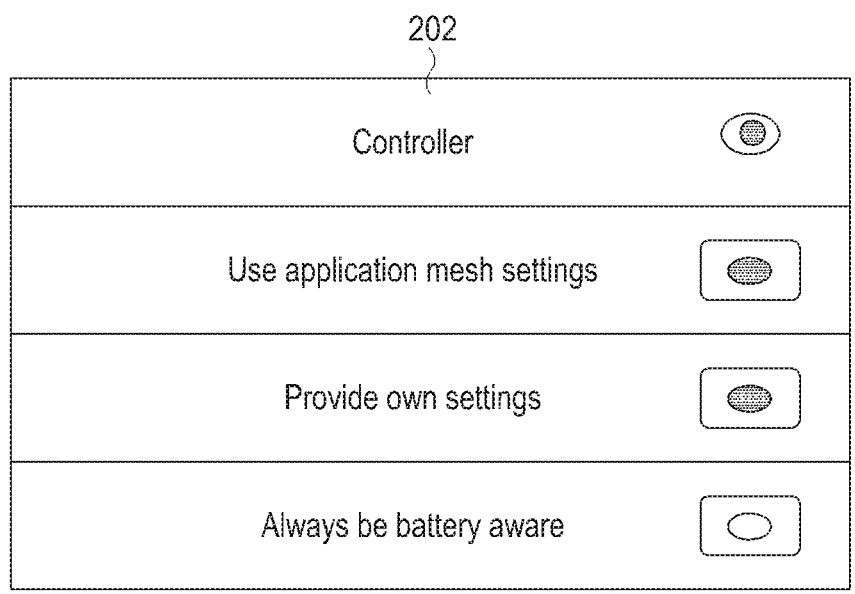

FIGS. 19A and 19B illustrate a method for configuring a BLE mesh network according to various embodiments of the present disclosure.

Referring to FIGS. 19A and 19B, in an embodiment of the present disclosure, the BLE mesh network may be configured by receiving the input from the user. In an embodiment of the present disclosure, the BLE mesh network may be configured by identifying the configuration parameters suitable for operation of the BLE mesh network based on either the network configuration values, or the default configuration values to meet the service requirements.

Referring to FIG. 19A, the BLE mesh network is configured by the use application mesh settings and provide own settings in the BLE mesh controller (or apparatus).

Referring to FIG. 19B, the BLE mesh network is configured by the parameter (e.g., the security, the reliability delay, the throughput, the geo-limit, and the power consumption).

Figure 20:
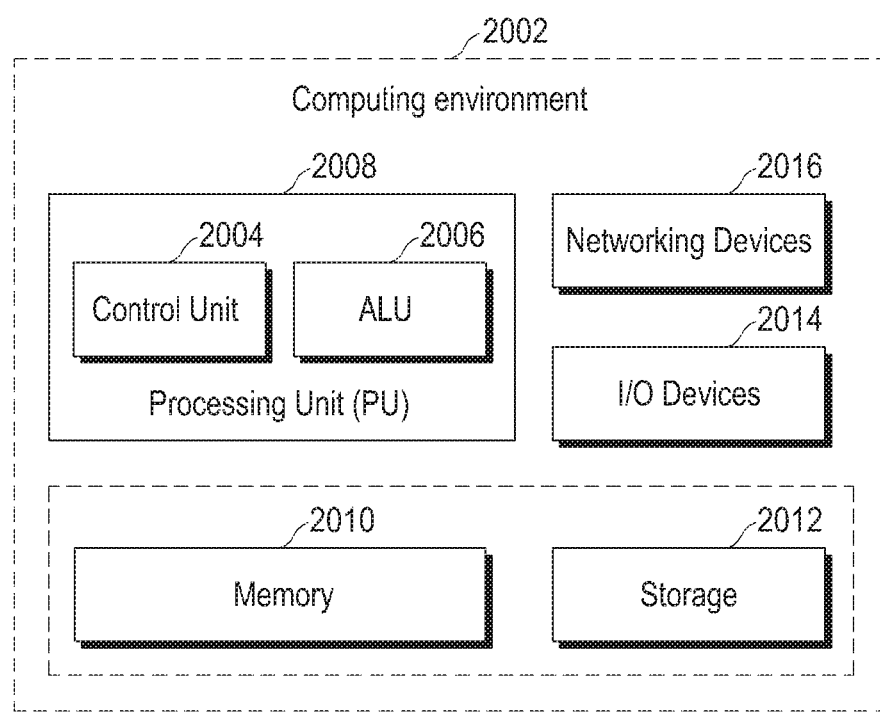
FIG. 20 illustrates a computing environment implementing a method and a system for dynamically forming a service aware BLE mesh network according to various embodiments of the present disclosure.

FIG. 20 illustrates a computing environment implementing a method and a system for dynamically forming a service aware BLE mesh network according to various embodiments of the present disclosure.

Referring to FIG. 20, a computing environment 2002 may comprise at least one processing unit 2008 that is equipped with a control unit 2004 and an arithmetic logic unit (ALU) 2006, a memory 2010, a storage 2012, at least one networking devices 2016 and at least one input/output (I/O) devices 2014. The processing unit 2008 is responsible for processing the instructions of the technique. The processing unit 2008 receives commands from the control unit in order to perform its processing. Further, any logical and arithmetic operations involved in the execution of the instructions are computed with the help of the ALU 2006.

The overall computing environment 2002 can include multiple homogeneous and/or heterogeneous cores, multiple central processing units (CPUs) of different kinds, special media and other accelerators. The processing unit 2008 is responsible for processing the instructions of the technique. Further, the plurality of processing units 2008 may be located on a single chip or over multiple chips.

The technique comprising of instructions and codes required for the implementation may be stored in either the memory unit 2010 or the storage 2012 or both. At the time of execution, the instructions may be fetched from the corresponding memory 2010 and/or storage 2012, and executed by the processing unit 2008.

In any hardware implementations, various networking devices 2016 or external I/O devices 2014 may be connected to the computing environment to support the implementation through the networking unit and the I/O device unit.

The computing environment 2002 may be an example illustrating the above-described controller.

The various embodiments disclosed herein can be implemented through at least one software program running on at least one hardware device and performing network management functions to control the elements. The elements shown in the FIGS. 1, 2, 3, 18, 19A, 19B, and 20 include blocks which can be at least one of a hardware device, or a combination of hardware device and software module.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of dynamically forming a service aware Bluetooth low energy (BLE) mesh network, the method comprising:
deriving service requirements for a BLE mesh service based on a unique identifier associated with the BLE mesh service;
determining a BLE mesh service to be provided based on at least one BLE parameter; and
dynamically forming a BLE mesh network based on the determined BLE mesh service, the service requirements and the at least one BLE parameter,
wherein the forming of the BLE mesh network further comprises:
observing a packet from a neighbor node of the BLE mesh network;
calculating a path loss based on a received signal strength indicator (RSSI) of the packet; and
determining a relay count by comparing the path loss with a threshold, the relay count being used for adjusting retransmission or relay.

2. The method of claim 1,
wherein the unique identifier comprises a universal unique identifier (UUID), and
wherein the at least one BLE parameter includes power status of participating nodes, and priority associated with the BLE mesh service, at least one of a number of participating nodes available, and role preferences of the participating nodes.

3. The method of claim 1, further comprising:
allowing the participating nodes to indicate a preference for a role based on one of the power status, an intent to relay data packets, and for the BLE mesh service.

4. The method of claim 1, further comprising:
forming a plurality of paths towards a destination node in the participating nodes based on priority associated with the BLE mesh service.

5. The method of claim 4, further comprising:
reconfiguring the BLE mesh network based on availability of the participating nodes.

6. The method of claim 1, wherein the BLE mesh network is configured by receiving an input from a user.

7. The method of claim 1, wherein the BLE mesh network is configured by identifying configuration parameters suitable for operation of the BLE mesh network based on at least one of network configuration values, and default configuration values to meet the service requirements.

8. The method of claim 1, further comprising:
mapping priority of each of the BLE mesh service and impact of each of the BLE mesh service based on a mesh performance parameter and on each of the participating node.

9. The method of claim 1,
wherein each node in the participating nodes maintains information related to each data packet transmitted through each of the node in a database, and
wherein the information comprises addresses of neighboring nodes, a message integrity check (MIC), retransmission counts, and at least one of a number overhearing based acknowledgements received from the participating nodes, and explicit acknowledgements received from the participating nodes.

10. The method of claim 9, further comprising:
varying the retransmission counts by overhearing packets and observing a received signal strength indicator (RSSI) variant.

11. An apparatus for forming a service aware Bluetooth low energy (BLE) mesh network, the apparatus comprising:
a network interface; and
a controller coupled to the network interface, wherein the controller is configured to:
derive service requirements for a BLE mesh service based on a unique identifier associated with the BLE mesh service,
determine a BLE mesh service to be provided based on at least one BLE parameter, and
dynamically form a BLE mesh network based on the determined BLE mesh service, the service requirements and the at least one BLE parameter,
wherein the controller is further configured to:
observe a packet from a neighbor node of the BLE mesh network, calculate a path loss based on a received signal strength indicator (RSSI) of the packet, and
determine a retransmission count by comparing the path loss with a threshold, and
wherein the relay count is used for adjusting retransmission or relay.

12. The apparatus of claim 11,
wherein the unique identifier comprises a universal unique identifier (UUID), and
wherein the at least one BLE parameter includes power status of participating nodes, and priority associated with the BLE mesh service, at least one of a number of participating nodes available, and role preferences of the participating nodes.

13. The apparatus of claim 11, wherein the controller is further configured to:
allow the participating nodes to indicate a preference for a role based on the power status, an intent to relay data packets, and for the BLE mesh service.

14. The apparatus of claim 11, wherein the controller is further configured to:
form a plurality of paths towards a destination node in the participating nodes based on priority associated with the BLE mesh service.

15. The apparatus of claim 14, wherein the controller is further configured to:
reconfigure the BLE mesh network based on availability of the participating nodes.

16. The apparatus of claim 11, wherein the BLE mesh network is configured by receiving an input from a user.

17. The apparatus of claim 11, wherein the controller is further configured to form the BLE mesh network by identifying a configuration parameter suitable for operation of the BLE mesh network based on at least one of network configuration values, and default configuration values to meet the service requirements.

18. The apparatus of claim 11, wherein the controller is further configured to map priority of each of the BLE mesh service and impact of each of the BLE mesh service based on a mesh performance parameter, and on each participating node.

19. The apparatus of claim 11,
wherein each node in the participating nodes maintains information related to each data packet transmitted through each of the node in a database, and
wherein the information comprises addresses of neighboring nodes, a message integrity check (MIC), retransmission counts, and at least one of a number overhearing based acknowledgements received from the participating nodes and explicit acknowledgements received from the participating nodes.

20. The apparatus of claim 19, further comprising:
varying the retransmission counts by overhearing packets and observing a received signal strength indicator (RSSI) variant.

21. At least one non-transitory machine-readable storage medium for storing a computer program of instructions configured to be readable by at least one processor for instructing the at least one processor to execute a computer process of:
deriving service requirements for a Bluetooth low energy (BLE) mesh service based on a unique identifier associated with the BLE mesh service;
determining a BLE mesh service to be provided based on at least one BLE parameter; and
dynamically forming a BLE mesh network based on the determined BLE mesh service, the service requirements and the at least one BLE parameter,
wherein the dynamically forming of the BLE mesh network further comprises:
observing a packet from a neighbor node of the BLE mesh network;
calculating a path loss based on a received signal strength indicator (RSSI) of the packet; and
determining a retransmission count by comparing the path loss with a threshold, the relay count being used for adjusting retransmission or relay.

* * * * *